(12) United States Patent
Ota

(10) Patent No.: US 7,749,416 B2
(45) Date of Patent: Jul. 6, 2010

(54) METHOD OF MANUFACTURING SUBSTRATE, METHOD OF MANUFACTURING LIQUID EJECTION HEAD, LIQUID EJECTION HEAD AND IMAGE FORMING APPARATUS

(75) Inventor: Hiroshi Ota, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 796 days.

(21) Appl. No.: 11/493,772

(22) Filed: Jul. 27, 2006

(65) Prior Publication Data
US 2007/0023960 A1 Feb. 1, 2007

(30) Foreign Application Priority Data
Jul. 29, 2005 (JP) .............................. 2005-220919

(51) Int. Cl.
*C04B 35/00* (2006.01)
(52) U.S. Cl. ...................... 264/104; 264/255; 264/260; 264/267; 425/127
(58) Field of Classification Search ................. 264/104, 264/272.11, 272.13, 272.16, 272.17, 255, 264/260, 259, 267; 425/127
See application file for complete search history.

(56) References Cited

U.S. PATENT DOCUMENTS

| | | | |
|---|---|---|---|
| 4,067,945 A * | 1/1978 | DuRocher .................. 264/104 |
| 5,216,807 A * | 6/1993 | Yoshizawa et al. ............ 29/876 |
| 5,600,884 A * | 2/1997 | Kondo et al. .................. 29/852 |
| 6,271,482 B1 * | 8/2001 | Crotzer et al. ............... 174/262 |
| 6,616,270 B1 | 9/2003 | Miyata et al. |
| 6,966,635 B2 | 11/2005 | Miyata et al. |
| 2002/0127893 A1 * | 9/2002 | Brodsky ...................... 439/66 |

FOREIGN PATENT DOCUMENTS

JP 2003-136721 A 5/2003

\* cited by examiner

*Primary Examiner*—Joseph S Del Sole
*Assistant Examiner*—Ninh V Le
(74) *Attorney, Agent, or Firm*—Birch, Stewart, Kolasch & Birch, LLP

(57) ABSTRACT

The method of manufacturing a substrate, includes the steps of: preparing first and second members, the first member having a non-side face which is a top or bottom face of the first member, and side faces which intersect with the non-side face and have recess parts, the recess parts having first openings on the side faces and second openings on the non-side face, the second member having flat surfaces; in a state where the flat surfaces of the second member are in contact with the side faces of the first member so that the first openings are closed with the flat surfaces while the second openings are open, filling conductive paste into the recess parts from the second openings; curing the conductive paste filled in the recess parts; and separating the second member from the first member on which conducting parts are formed from the cured conductive paste.

8 Claims, 20 Drawing Sheets

METHOD OF MANUFACTURING SUBSTRATE, METHOD OF MANUFACTURING LIQUID EJECTION HEAD, LIQUID EJECTION HEAD AND IMAGE FORMING APPARATUS

BACKGROUND OF THE INVENTION

1. Field of the Invention

The present invention relates to a method of manufacturing a substrate, a method of manufacturing a liquid ejection head, a liquid ejection head and an image forming apparatus, and more particularly, to a method of manufacturing a substrate, a method of manufacturing a liquid ejection head, a liquid ejection head and an image forming apparatus, in which three-dimensional wiring is formed.

2. Description of the Related Art

An image forming apparatus has an ink ejection head having an arrangement of a plurality of nozzles (ejection ports) for ejecting ink, and forms images on a recording medium, such as paper, by ejecting ink from the nozzles toward the recording medium, while moving the ink ejection head and the recording medium relatively to each other.

In the ink ejection head in the image forming apparatus, for example, piezoelectric bodies are used as pressure generating devices for ejecting ink, and a diaphragm which forms one wall of the pressure chambers is deformed by the deformation of the piezoelectric bodies, thereby changing the volume of the pressure chambers, and causing ink inside the pressure chambers to be ejected from the nozzles in the form of droplets.

In recent years, there have been demands for improved image quality and higher recording speeds in image forming apparatuses having ink ejection heads, and in order to achieve this, it is essential to increase the number of nozzles and to arrange these nozzles at higher density.

In order to achieve an increased number of nozzles and higher nozzle density, it is necessary to arrange the pressure chambers connected to the nozzles at high density, as well as laying out the electrical wires (drive wires) which supply drive signals to the piezoelectric bodies disposed corresponding to the respective pressure chambers, at high density also.

Furthermore, in general, a mode is known in which piezoelectric bodies are driven in a so-called "bending distortion mode", and in this mode, it is necessary to ensure sufficient spaces to prevent obstruction of the movement of the piezoelectric bodies, on the side of the piezoelectric bodies reverse to the side where they are fixed to the diaphragm. Therefore, in general, the connection between the upper electrode of the piezoelectric body and the external wire must pass through the space.

With the object of simplifying the structure of an inkjet head and reducing the size of the inkjet head, Japanese Patent Application Publication No. 2003-136721 (and in particular, FIGS. 7 to 9) discloses a head having a bonding member connected to the piezoelectric body side of a flow channel forming substrate having pressure chambers, a diaphragm and piezoelectric bodies, in which installation sections for connecting external wires are provided on the bonding member in regions corresponding to the piezoelectric bodies, and drive wires (connection wires) are installed, one end of each wire being connected to the installation section on the bonding member, and the other end thereof being connected to the piezoelectric body. For these drive wires, more specifically, it is disclosed to form drive wires by wire bonding so as to pass along through holes (through grooves) which pass through the bonding member. Furthermore, a thin film (wiring film) is formed by sputtering on the internal face (oblique surface) of the through holes (through grooves) which have an oblique surface, as well as passing through the bonding member in the thickness direction.

If it is sought to install wires at high density in a case where through holes are formed in the thickness direction of a bonding member and drive wires are formed by wire bonding so as to pass through these through holes, as disclosed in Japanese Patent Application Publication No. 2003-136721, then there may be a problem that the wires contact with each other, and moreover, the through holes must be formed to have a diameter allowing a wire bonding probe to be inserted. Furthermore, the cross-sectional surface area of the drive wires must be made smaller than the surface area of the opening of the through holes. Therefore, in practice, it is not possible to install the wiring to a high density.

Moreover, if through holes are opened in the thickness direction of the bonding member and a thin film is formed by sputtering on the internal surface of the through holes, then after forming the thin film by sputtering, a patterning step is required in order to achieve independent drive wires for each piezoelectric body.

SUMMARY OF THE INVENTION

The present invention has been contrived in view of the aforementioned circumstances, an object thereof being to provide a method of manufacturing a substrate, a method of manufacturing a liquid ejection head, a liquid ejection head, and an image forming apparatus, whereby wiring can be installed at high density, and wiring can be performed easily and reliably.

In order to attain the aforementioned object, the present invention is directed to a method of manufacturing a substrate, comprising the steps of: preparing a first member having side faces in which recess parts are formed, and a second member having flat surfaces; causing the flat surfaces of the second member to abut against the side faces of the first member in which the recess parts are formed so that one end of each of the recess parts is open to form an open end, and in this state, filling conductive paste into the recess parts from the open ends of the recess parts; curing the conductive paste filled in the recess parts; and separating the second member from the first member on which conducting parts are formed from the cured conductive paste, wherein portions of exposed surfaces of the conducting parts that are exposed at the side faces of the first member are used as first electrodes, and end parts of the conducting parts that correspond to the open ends used for filling the conductive paste, are used as second electrodes.

According to the present invention, by using the portion of the exposed surface of the conducting part which is exposed at the side face of the first member, as the first electrode, and by using the end section of the conducting part, which abuts with the open end used to fill the conductive paste, as the second electrode, it is possible to use the conducting part, which has the first electrode and the second electrode at either end thereof, as a three-dimensional wire. Therefore, the wires can be arranged at high density. Moreover, it becomes possible to bond the electrodes of the substrate with the electrodes of other components (such as the actuators) in an open state, in other words, in a state where the bonding conditions can be confirmed readily by means of an imaging device, or the like, and hence wiring can be carried out easily and reliably.

Preferably, the second member is a forming mold; and the first member is a molded object made of resin formed by using at least the second member.

According to this aspect of the present invention, it is possible to carry out the formation of the first member and the formation of the conducting parts of the first member, in a continuous fashion, and hence a substrate suited to three-dimensional wiring can be manufactured readily.

In order to attain the aforementioned object, the present invention is also directed to a method of manufacturing a liquid ejection head comprising pressure chambers connected to ejection ports which eject liquid, and actuators which apply pressure to the liquid in the pressure chambers, the method comprising the steps of: using a substrate manufactured by the above-described method, as a spacer which ensures spaces around the actuators; bonding the first electrodes of the substrate to the actuators; and connecting the second electrodes of the substrate to external wires for applying drive signals to the actuators from an external source.

According to the present invention, it is possible for the spacer which ensures the space at the periphery of the actuator to be used also as the substrate for three-dimensional wiring, and furthermore, the bonding between the actuator and the substrate is carried out in an open state, in other words, a state where the bonding conditions can be confirmed readily by means of an imaging apparatus, or the like. Therefore, wiring can be carried out easily and reliably. Furthermore, the bonding between the conducting parts of the spacer and the external wires can be made by a face-to-face bond, and hence bonding by through holes or bumps becomes possible. Therefore, the surface area required for bonding can be minimized.

In order to attain the aforementioned object, the present invention is also directed to a liquid ejection head, comprising: pressure chambers connected to ejection ports which eject liquid; actuators which apply pressure to liquid inside the pressure chambers; and a spacer which ensures spaces around the actuators, the spacer being formed with conducting parts, each of the conducting parts having a first electrode which is exposed at a side face of the spacer and is connected to the actuator, and a second electrode which is exposed at an upper face of the spacer and is connected to an external wire for applying drive signals to the actuator.

In order to attain the aforementioned object, the present invention is also directed to an image forming apparatus, comprising: the above-described liquid ejection head, wherein the image forming apparatus forms an image on a recording medium by moving the liquid ejection head relatively to the recording medium, and ejecting ink from the liquid ejection head toward the recording medium.

According to these aspects of the present invention, it is possible to form an image of high quality by means of a liquid ejection head having ejection ports arranged at high density.

According to the present invention, it is possible to arrange wires at high density, and furthermore, wiring can be carried out easily and reliably.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Structure of Liquid Ejection Head

Figure 1:
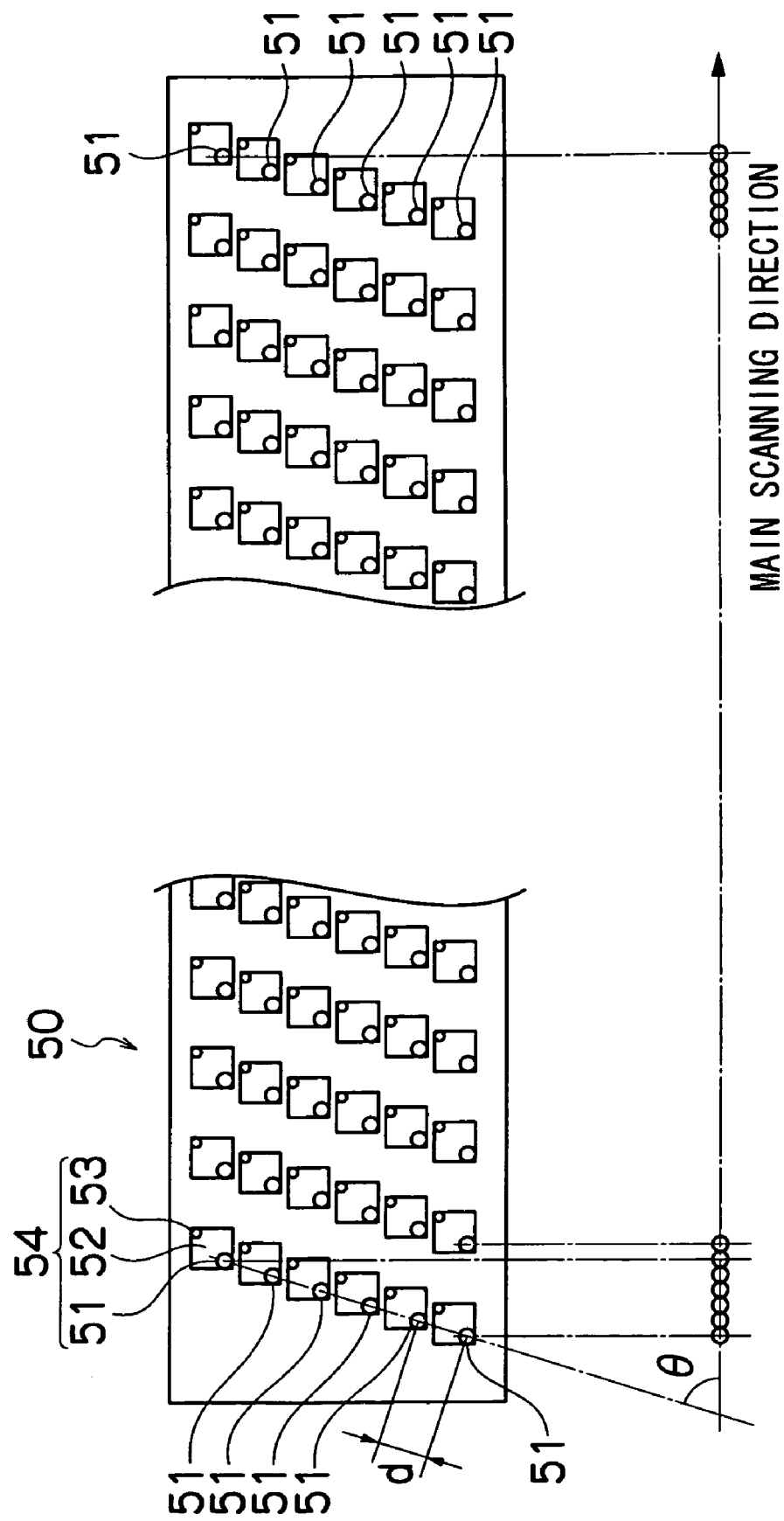
FIG. 1 is a plan view perspective diagram showing the general structure of a liquid ejection head according to an embodiment of the present invention.

FIG. 1 is a plan view perspective diagram showing the general structure of a liquid ejection head 50 according to an embodiment of the present invention.

In FIG. 1, the liquid ejection head 50 comprises a plurality of pressure chamber units 54 arranged in a two-dimensional configuration, each pressure chamber unit 54 having a nozzle (ejection port) 51, which ejects ink toward a recording medium, such as paper, a pressure chamber 52 connected to the nozzle 51, and an ink supply port 53 forming an opening section through which the ink is supplied to the pressure chamber 52. In FIG. 1, in order to simplify the drawing, a portion of the pressure chamber units 54 is omitted from the drawing.

The plurality of nozzles 51 are arranged in the form of a two-dimensional matrix, following two directions: a main scanning direction (in the present embodiment, the direction substantially perpendicular to the conveyance direction of the recording medium); and an oblique direction forming a pre-scribed angle of $\theta$ with respect to the main scanning direction. More specifically, by arranging a plurality of nozzles 51 at a uniform pitch of d in an oblique direction forming a uniform angle of $\theta$ with respect to the main scanning direction, it is possible to treat the nozzles 51 as being equivalent to an arrangement of nozzles at a prescribed pitch (d×cos $\theta$) in a straight line in the main scanning direction. According to this nozzle arrangement, it is possible to achieve a composition which is substantially equivalent to a high-density nozzle arrangement which reaches 2400 nozzles per inch in the main scanning direction, for example. In other words, a high density is achieved for the effective nozzle pitch (projected nozzle pitch) obtained by projecting the nozzles to a straight line aligned with the lengthwise direction of the liquid ejection head 50 (main scanning direction). The nozzle arrangement following two directions as shown in FIG. 1 is called a two-dimensional matrix nozzle arrangement.

Furthermore, the plurality of pressure chambers 52 connected in a one-to-one correspondence with the plurality of nozzles 51 are arranged in a two-dimensional matrix configuration, similarly to the nozzles 51.

Figure 2:
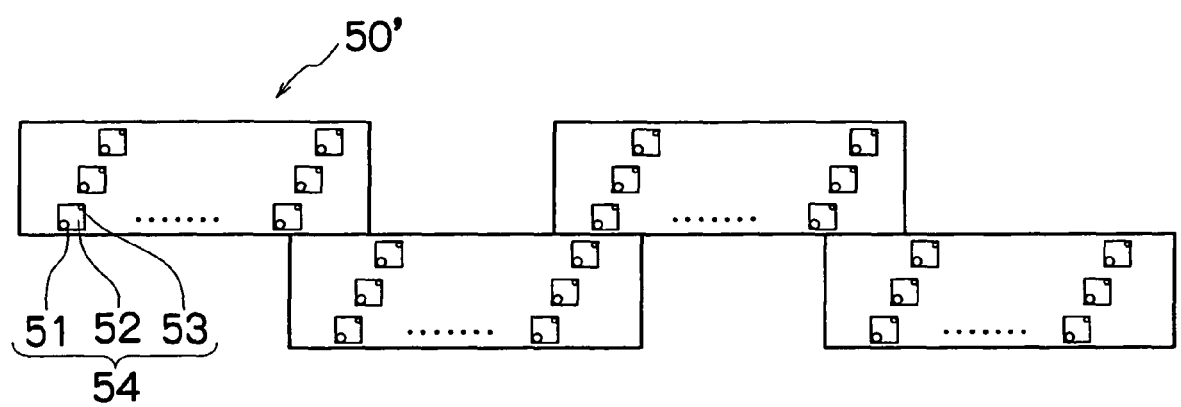
FIG. 2 is a plan view perspective diagram showing a further example of the general structure of a liquid ejection head according to the present embodiment.

In implementing the present invention, the arrangement structure of the nozzles 51, and the like, is not limited in particular to the embodiment shown in FIG. 1. For example, as shown in FIG. 2, it is also possible to compose a liquid ejection head having nozzle rows of a length corresponding to the full width of the recording medium, by joining together in a staggered matrix arrangement, a number of short liquid ejection head blocks 50', in which a plurality of nozzles 51 are arranged two-dimensionally. The nozzle arrangement shown in FIG. 2 is also the two-dimensional matrix nozzle arrangement.

In either of the cases of the nozzle arrangements shown in FIGS. 1 and 2, it is possible to compose the full line type liquid ejection head comprising the row of nozzles covering the length corresponding to the full width of the recording medium in the main scanning direction (the direction substantially perpendicular to the conveyance direction of the recording medium).

Figure 3:
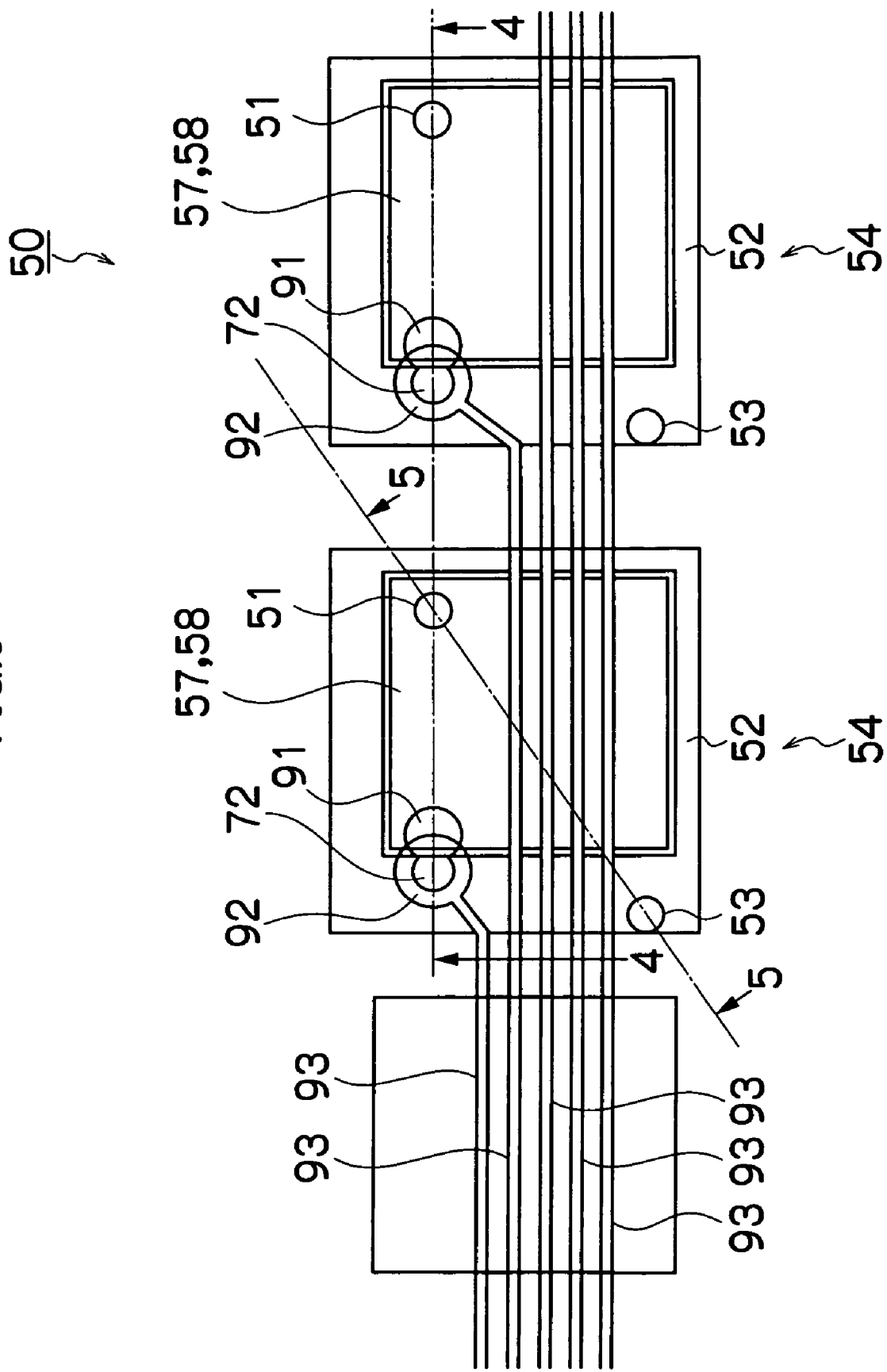
FIG. 3 is a plan view perspective diagram showing a detailed view of a portion of the liquid ejection head shown in FIG. 1.

FIG. 3 is a plan view perspective diagram showing a detailed enlarged view of a portion of the liquid ejection head 50 shown in FIG. 1. Furthermore, FIG. 4 is a cross-sectional view along line 4-4 in FIG. 3, and FIG. 5 is a cross-sectional view along line 5-5 in FIG. 3.

Figure 4:
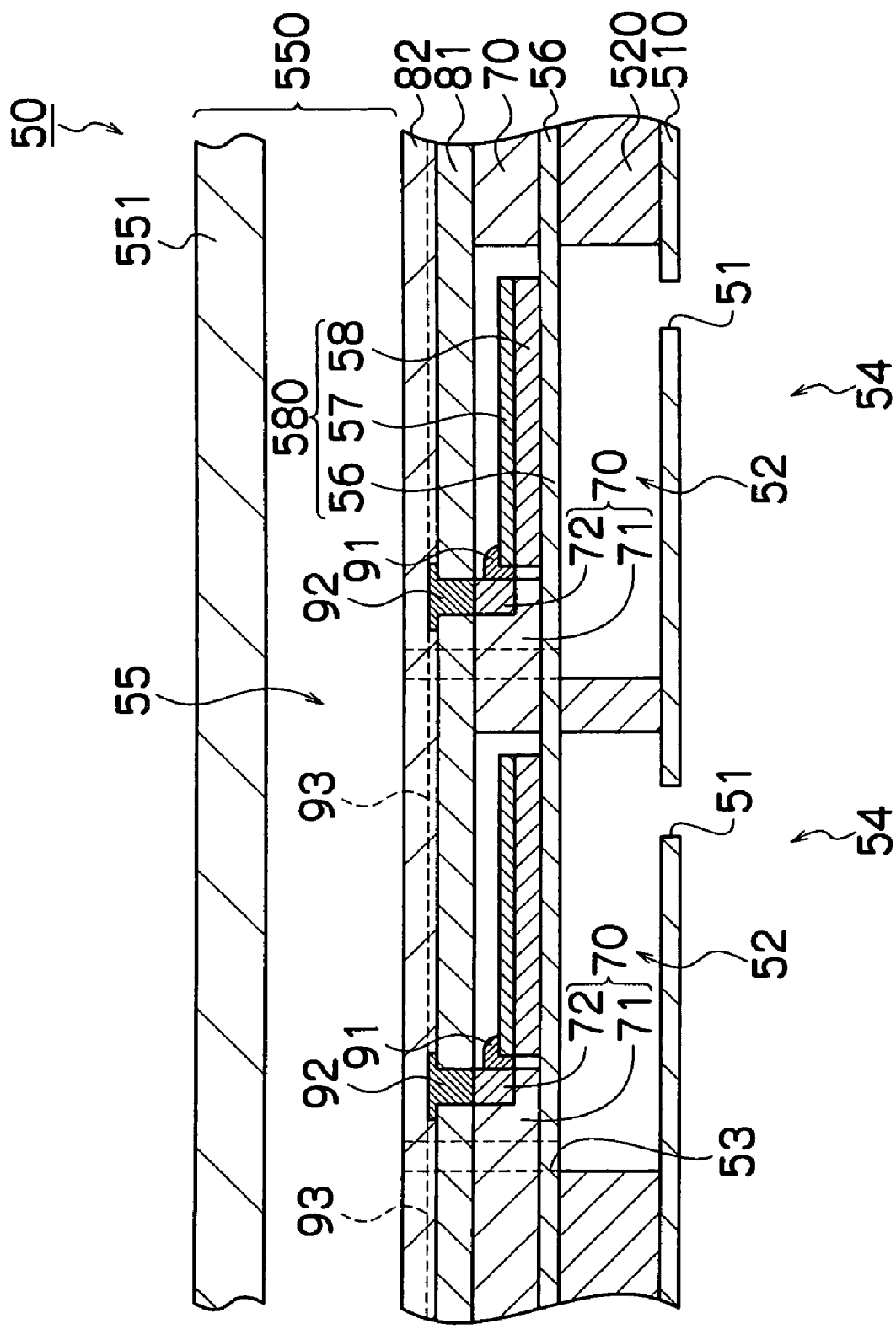
FIG. 4 is a cross-sectional diagram along line 4-4 in FIG. 3.
Figure 5:
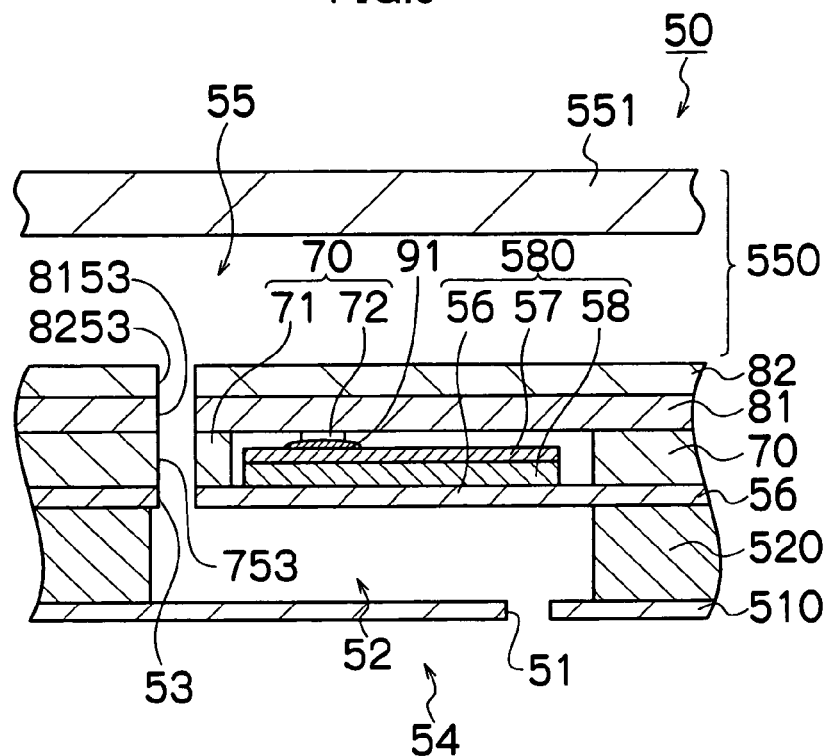
FIG. 5 is a cross-sectional diagram along line 5-5 in FIG. 3.

As shown in FIGS. 4 and 5, the liquid ejection head 50 is principally constituted by bonding together the following members: a nozzle plate 510, in which the plurality of nozzles (ejection ports) 51 are formed; a pressure chamber plate 520, in which the plurality of pressure chambers 52 connected to the nozzles 51 are formed in a one-to-one correspondence with the nozzles 51; a diaphragm (also referred to as an "actuator plate") 56, which constitutes one face (the vibrating face) of the pressure chambers 52 and has actuators 580 serving as pressure generating devices that apply pressure to the liquid inside the pressure chambers 52 by changing the volume of the pressure chambers 52; a spacer (also referred to as a "three-dimensional wiring plate") 70, which ensures spaces about the periphery of the actuators 580 (and in particular piezoelectric bodies 58) and has conducting parts 72 forming three-dimensional wires for supplying drive signals to the actuators 580; a horizontal wiring plate (also referred to as an "external wiring plate") 81, in which horizontal wires (also referred to as external wires) 93 connected to the conducting parts 72 of the spacer 70 are formed; a protective plate 82, which protects the horizontal wires 93 of the horizontal wire plate 81; and a common liquid chamber plate 550, in which a common liquid chamber 55 connected to a plurality of pressure chambers 52 is formed.

The diaphragm 56 is disposed on the surface of the pressure chamber plate 520 reverse to the surface on which the nozzle plate 510 is installed, in such a manner that the diaphragm 56 faces the nozzle plate 510 across the pressure chamber plate 520. In other words, when the pressure chambers 52 are observed with the nozzles 51 facing downwards, then the diaphragm 56 is arranged above the plurality of pressure chambers 52.

The diaphragm 56 is grounded, the piezoelectric bodies 58 are fixed on the surface of the diaphragm 56 reverse to the surface adjacent to the pressure chambers 52, and individual electrodes 57 are formed on the surfaces of the piezoelectric bodies 58 reverse to the surfaces adjacent to the diaphragm 56. The piezoelectric bodies 58 are made of a piezoelectric material, for example. The piezoelectric bodies 58 generate a displacement (distortion), when a prescribed electrical signal (drive signal) is applied to the corresponding individual electrodes 57, thereby changing the volume of the pressure chambers 52 through the diaphragm 56. The actuators 580 forming the pressure generating devices are constituted by the diaphragm 56, the piezoelectric bodies 58 and the individual electrodes 57.

In the present embodiment, the piezoelectric bodies 58 are fixed directly onto the diaphragm 56; however, it is also possible to provide independent electrodes between the diaphragm 56 and the piezoelectric bodies 58. In other words, individual electrodes may be provided on both the upper and lower surfaces of the piezoelectric bodies 58.

Furthermore, the diaphragm 56 according to the present embodiment is formed by a single plate that is common for the plurality of pressure chambers 52; however, it is not limited to a case of this kind, and diaphragms may be formed separately for the pressure chambers 52.

A drive signal is supplied to the individual electrode 57 formed on the upper surface of the piezoelectric body 58, from a source (more specifically, a head driver 154 shown in FIG. 22 and described hereinafter) outside the liquid ejection head 50, through the horizontal wire (external wire) 93 on the horizontal wiring plate 81, the conducting material (for example, a hardened conductive paste) 92 on the horizontal wiring plate 81, which connects the horizontal wire 93 and the conducting part 72 on the spacer 70, the conducting part 72 of the spacer 70, and a conducting bonding material (for example, solder) 91 which connects the conducting part 72 of the spacer 70 with the individual electrode 57 of the actuator 580.

The common liquid chamber 55 is connected to an upstream ink tank (more specifically, an ink tank 60 in FIG. 21 described hereinafter), and the ink supplied from the ink tank 60 is distributed to the plurality of pressure chambers 52.

FIG. 4 shows only a portion corresponding to two pressure chamber units 54, of the liquid ejection head 50 shown in FIG. 1, and furthermore, FIG. 5 shows only a portion corresponding to one pressure chamber unit 54. In both FIGS. 4 and 5, only the ceiling 551 is depicted, of the walls constituting the common liquid chamber 55; however, in actual practice, there are side walls in the common liquid chamber 55, which are not shown in FIGS. 4 and 5. More specifically, the common liquid chamber plate 550 has the side walls (not shown), in addition to the ceiling plate 551.

The common liquid chamber plate 550, in which the common liquid chamber 55 is formed, is arranged on the side of the lamination of the protective plate 82, the horizontal wiring plate 81, the spacer 70, and the diaphragm 56, reverse to the side adjacent to the pressure chamber plate 520. More specifically, when the pressure chambers 52 are observed with the nozzles 51 facing downward, the common liquid chamber 55 is formed as a flow channel (common rear surface flow channel) constituting a single common space, above the plurality of pressure chambers 52, in such a manner that it covers the rear surface of all of the pressure chambers 52.

By means of the common liquid chamber 55 formed as the common rear surface flow channel of this kind, it is possible to arrange the nozzles 51 at high density and ink is supplied to the pressure chambers 52 with good refilling characteristics.

More specifically, in FIG. 5, the liquid supplied to the common liquid chamber 55 from outside the liquid ejection head 50 is supplied to the pressure chambers 52 from the common liquid chamber 55, via through holes 8253 in the protective plate 82, through holes 8153 in the horizontal wiring plate 81, through holes 753 in the spacer 70, and the through holes 53 in the diaphragm 56 (in other words, the ink supply ports 53 of the pressure chambers 52).

Detailed Structure of Spacer

Figure 6:
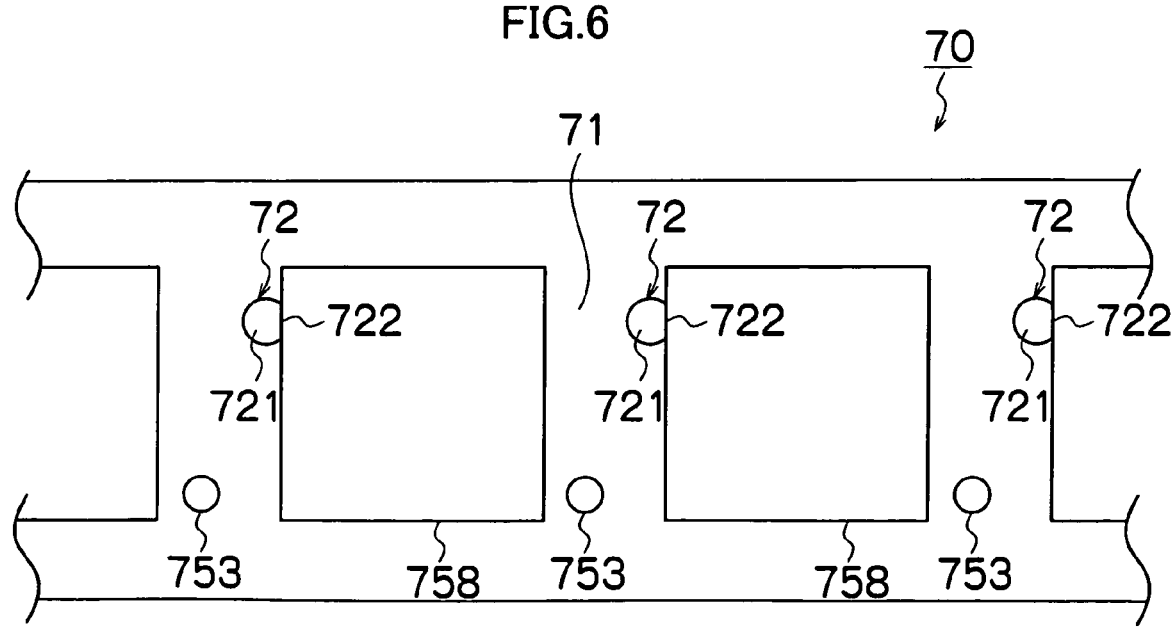
FIG. 6 is a plan diagram of a spacer serving as a substrate for three-dimensional wiring.

FIG. 6 shows a plan diagram of an embodiment of the spacer (three-dimensional wiring plate) 70, which serves as a substrate for the three-dimensional wires, as well as being used as a plate for ensuring spaces about the periphery of the actuators 580 (in particular, the piezoelectric bodies 58).

The spacer 70 shown in FIG. 6 is constituted by: a base plate 71 made of insulating material; conducting parts 72 made of conducting material; large opening parts 758 having a larger opening surface area than the horizontal surface area of the piezoelectric bodies 58 in such a manner that the piezoelectric bodies 58 are arranged therein; and through holes (small openings) 753 having substantially the same opening surface area as the opening surface area of the ink supply ports 53 of the pressure chambers 52, which connect to the ink supply ports 53 of the pressure chambers 52.

Furthermore, the spacer 70 has a greater thickness than the total thickness of the piezoelectric body 58 and the individual electrode 57, in such a manner that the spacer 70 ensures a space above each actuator 580 (in other words, above each individual electrode 57).

The bottom surface of the spacer 70 is bonded to the surface of the diaphragm 56 to which the piezoelectric bodies 58 are fixed, and by positioning the piezoelectric bodies 58 inside the large opening parts 758 of the spacer 70, the piezoelectric bodies 58 are protected by the spacer 70. In other words, the spaces that are sufficient to prevent obstruction of the movement of the piezoelectric bodies 58 are ensured.

The conducting parts 72 of the spacer 70 are column-shaped. An upper end face 721 of each conducting part 72 is exposed on the upper surface of the spacer 70, and a side face 722 of each conducting part 72 is exposed on one side face of the spacer 70 (more specifically, a side face defining the large opening part 758).

In each conducting part 72, the portion of the side face 722 exposed on the side face defining the large opening part 758 of the spacer 70 is used as one electrode (a lower electrode), and the upper end face 721, which is exposed on the upper surface of the spacer 70, is used as another electrode (an upper electrode).

Figure 7:
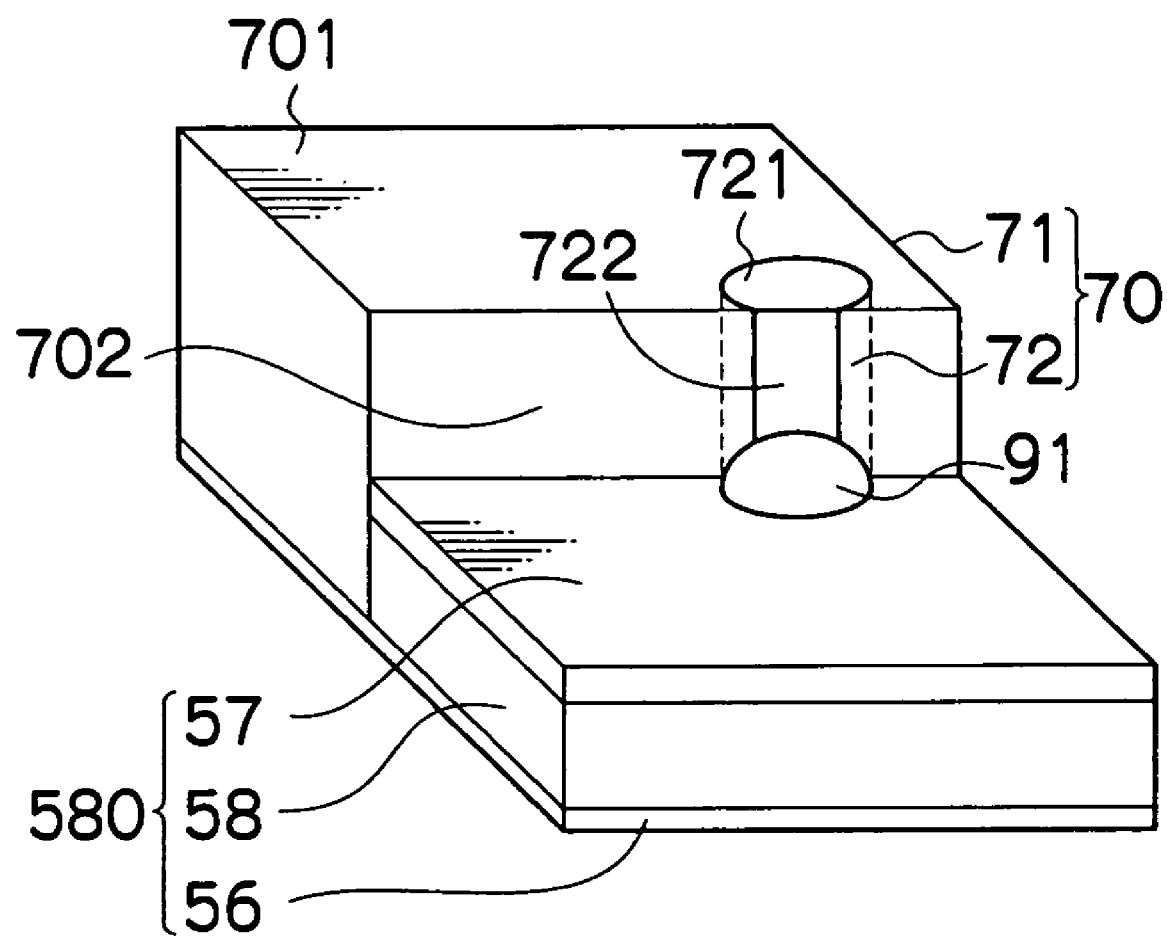
FIG. 7 is an oblique diagram showing a mode of electrical bonding between the spacer and an actuator.

FIG. 7 is an oblique diagram showing an embodiment of a mode of bonding the conducting parts 72 of the spacer 70 with the individual electrodes 57 of the actuators 580.

In FIG. 7, the conducting part 72 of the spacer 70 and the individual electrode 57 of the piezoelectric actuator 580 are bonded together by means of the conductive bonding material 91 (for example, solder) formed in a fillet shape.

More specifically, the conducting part 72 of the spacer 70 has the flat side face 722 in line with the axial direction of the conducting part 72, and this side face 722 is exposed on one side face 702 of the spacer 70 (more specifically, the side wall defining the large opening part 758 in FIG. 6), and the lower part of the side face 722 is bonded by means of conductive bonding material 91 (for example, solder) to the end portion of the upper face of the individual electrode 57 of the actuator 580, to form one electrode (the lower electrode) of the conducting part 72.

On the other hand, the upper end face 721 of the conducting part 72 of the spacer 70 is exposed on the upper surface 701 of the spacer 70 (more specifically, the surface bonded to the bottom face of the horizontal wiring plate 81 as shown in FIGS. 4 and 5), and this upper end face 721 is bonded by conductive material 92 to the horizontal wire 93 of the horizontal wiring plate 81, as another electrode (an upper electrode) of the conducting part 72.

There are various modes of a spacer (three-dimensional wiring plate) 70 having column-shaped conducting parts 72 formed so as to have an exposed upper end face 721 and a side face 722.

FIGS. 8A, 8B, 8C and 8D are oblique diagrams respectively showing typical embodiments of spacers (a first example 70a, a second example 70b, a third example 70c and a fourth example 70d).

Figure 8A:
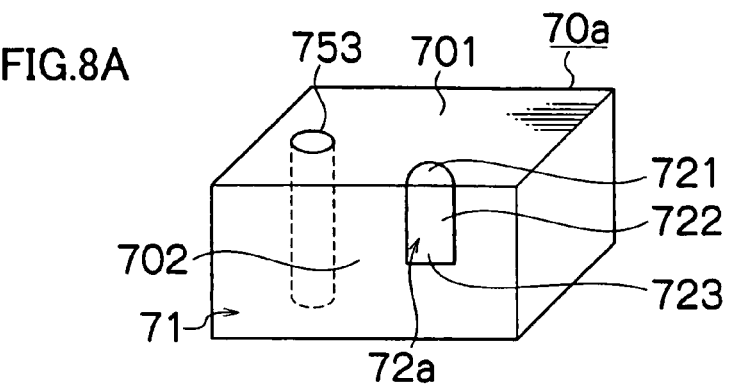
FIGS. 8A to 8D are oblique diagrams showing typical embodiments of spacers.

The spacer 70a of the first example shown in FIG. 8A has a semi-cylindrical conducting part 72a. More specifically, the upper end face 721 of the conducting part 72a has a semicircular shape and is exposed on the upper face 701 of the spacer 70a (the upper face of the base plate 71), as a first electrode (upper electrode) of the conducting part 72a. Furthermore, the side face 722 formed in line with the axial direction of the conducting part 72a is exposed on one side face 702 (the side face of the base plate 71) defining the large opening part 758 of the spacer 70a, and the lower part 723 of this side face 722 constitutes another electrode (lower electrode) of the conducting part 72a.

As shown in FIG. 5 as well, through holes 753 constituting parts of flow channels from the common liquid chamber 55 to the pressure chambers 52 are formed in the spacer 70a.

Figure 8B:
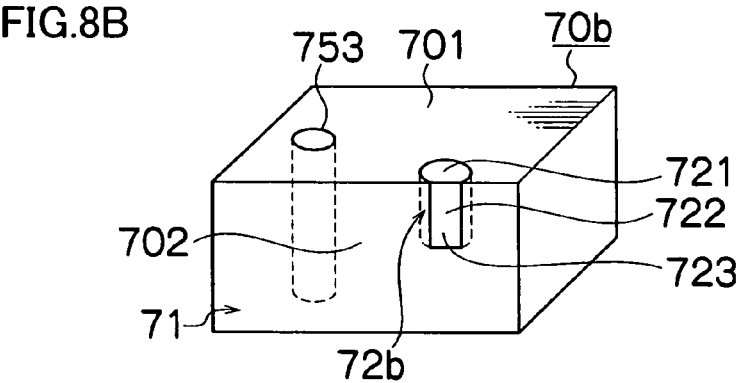

The spacer 70b of the second example shown in FIG. 8B has a conducting part 72b of a substantially cylindrical shape with a side face 722 that is smaller than the conducting part 72a of the spacer 70a of the first example shown in FIG. 8A. More specifically, the shape of the upper end face 721 of the conducting part 72b in the second example is a so-called bow shape.

Figure 9A:
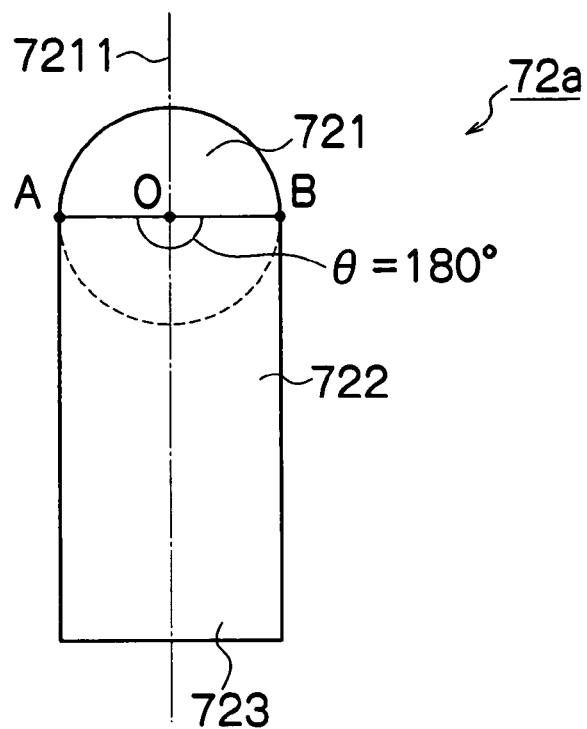
FIGS. 9A and 9B are oblique diagrams showing typical embodiments of the conducting parts of the spacers.
Figure 9B:
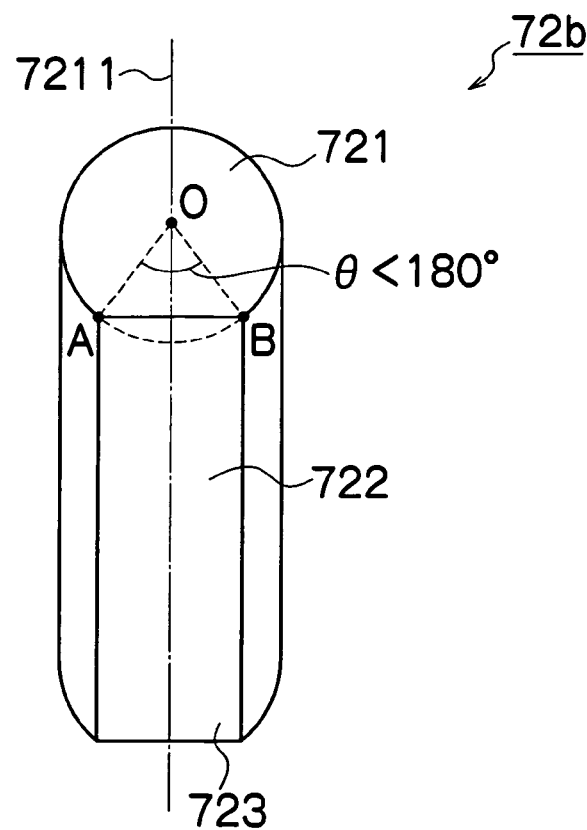

FIG. 9A shows the conducting part 72a of the spacer 70a of the first example, and FIG. 9B shows the conducting part 72b of the spacer 70b of the second example, in order to readily understand the points of difference between the spacer 70a of the first example shown in FIG. 8A and the spacer 70b of the second example shown in FIG. 8B.

The upper end surface 721 of the conducting part 72a of the first example in FIG. 9A is composed by a semi-circular shape defined by an arc AB and a chord (straight line) AB passing through the center O.

On the other hand, the upper end face 721 of the conducting part 72b of the second example in FIG. 9B is composed by a so-called bow shape defined by an arc AB and a chord (straight line) AB. The central angle θ of the arc AB is smaller than 180 degrees. In other words, in a horizontal cross-section of the conducting part 72b, the chord AB subtending the shorter arc (minor arc) is exposed on the side face of the spacer 70b, and the longer arc (major arc) is disposed on the inner side of the spacer 70b.

Furthermore, as shown in FIG. 8B, the base plate 71 of the spacer 70b of the second example forms overhangs with respect to the side face 722 of the conducting part 72b, in such a manner that the side face 722 exposed on the conducting part 72b of the spacer 70b is held from either side in the horizontal direction.

Each of the spacers 70a and 70b shown in FIGS. 8A and 8B has one flat side face 722 on the conducting part 72, whereas the other side face is curved; however, the shapes of the conducting parts are not limited in particular to cases such as this, and it is also possible to form all of the side faces of the conducting part 72 to flat shapes by forming the conducting part 72 to a prism shape.

Figure 8C:
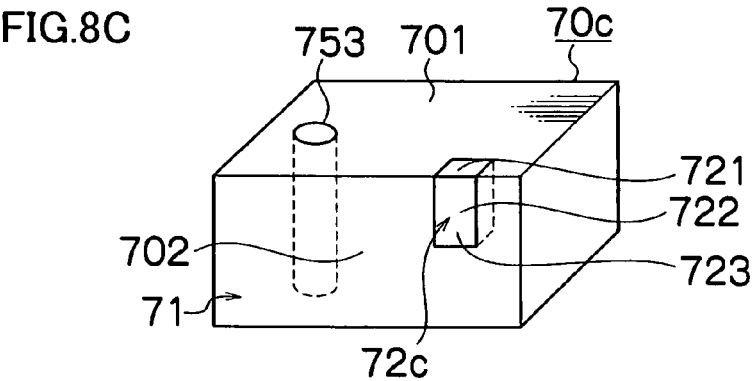

The conducting part 72c of the spacer 70c of the third example shown in FIG. 8C has a quadrilateral prism shape. When the conducting part 72 of the spacer 70 is formed to a prism shape, it is not limited in particular to a quadrilateral prism as in FIG. 8C, and it may also be a hexagonal prism shape, or another prism shape. Furthermore, the base plate 71 of the spacer 70c shown in FIG. 8C has no overhang with respect to the side face 722 of the conducting part 72c; however, it is also possible to form the base plate 71 to have overhangs with respect to the side face 722 of the conducting part 72. For example, the horizontal cross-sectional shape of the conducting part 72 is taken to be a trapezoidal shape, and the conducting part 72 is formed in such a manner that the shorter edge of the upper and lower edges of different lengths in the trapezoidal shape is exposed on the side face 702 of the spacer 70.

Figure 8D:
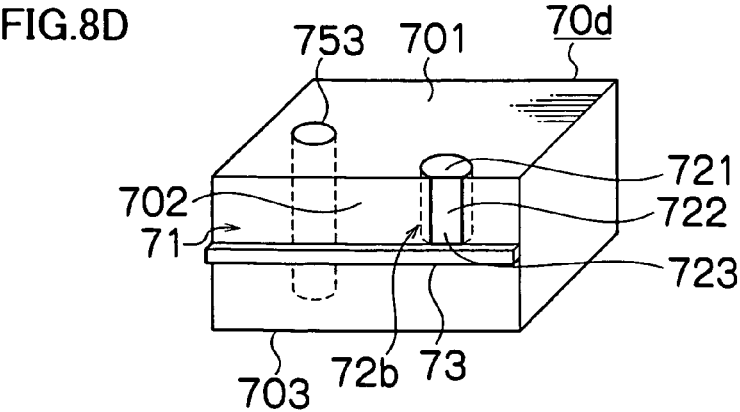

The spacer 70d of the fourth example shown in FIG. 8D has a conducting part 72b of the same shape as the conducting part 72b of the spacer 70b of the second example shown in FIG. 8B. Furthermore, in contrast to the spacer 70b of the second example shown in FIG. 8B, the spacer 70d of the fourth example is formed with a rib 73 between the lower part 723 of the conducting part 72b and the lower face 703 of the spacer 72. The rib 73 extends in the direction substantially perpendicular to the axial direction of the conducting part 72b.

When the lower electrode 723 of the conducting part 72b in the fourth example and the individual electrode 57 of the actuator 580 are bonded together by the conductive bonding material 91 (for example, solder), then the rib 73 formed below the conducting part 72b prevents the conductive bonding material 91 from falling downward, and thereby prevents electrical shorting between the individual electrode 57 and the diaphragm 56 forming the common electrode.

Figure 10:
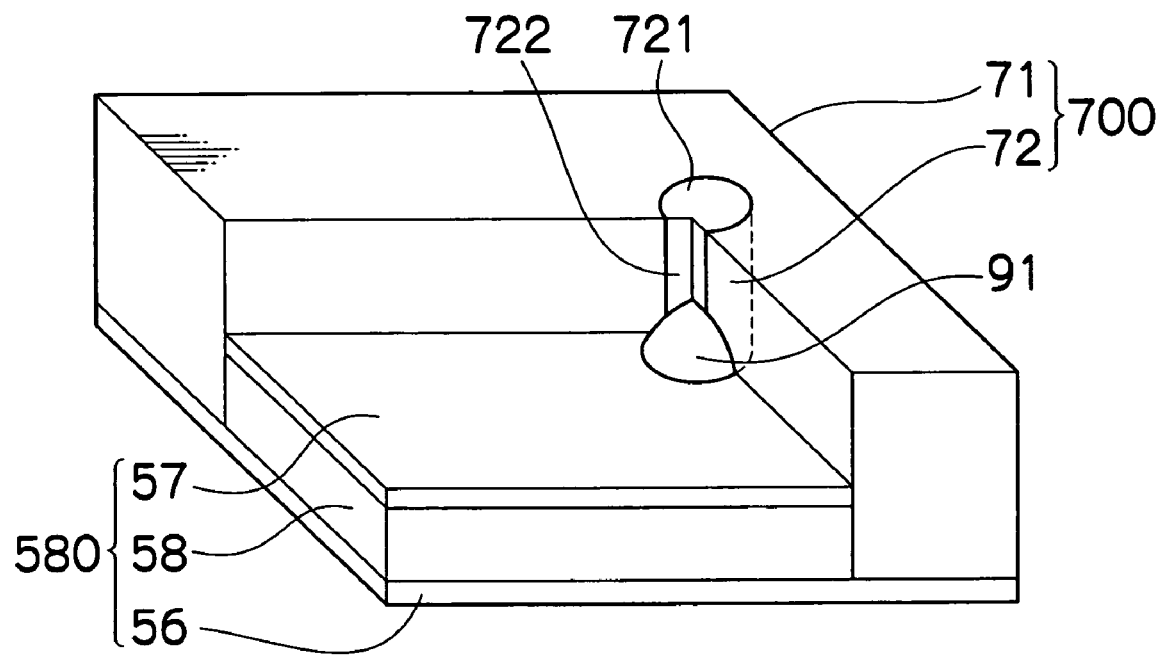
FIG. 10 is a perspective diagram showing a further embodiment of a mode of electrical bonding between the spacer and the actuator.

Moreover, in FIGS. 8A to 8D, the conducting part 72 is formed so that the side face 722 thereof is exposed on the flat side face 702 of the spacer 70, as described with reference to FIG. 7; however, it is also possible to form a conducting part 72 in a section corresponding to the corner of the piezoelectric body 58 and the individual electrode 57, as in a spacer 700 shown in FIG. 10.

Method of Manufacturing Spacer

FIGS. 11A to 11F and FIGS. 12A to 12F are illustrative diagrams for describing an embodiment of the sequence of a method of manufacturing the spacer 70.

FIGS. 11A to 11F and FIGS. 12A to 12F show schematic drawings of an example of manufacturing the spacer 70b shown in FIG. 8B. Furthermore, FIGS. 12A to 12F are vertical cross-sectional diagrams of FIGS. 11A to 11F, respectively, along line 12-12 in FIG. 11A; and FIGS. 11A to 11F are horizontal cross-sectional diagrams of FIGS. 12A to 12F, respectively, along line I-I in FIG. 12A.

Figure 11A:
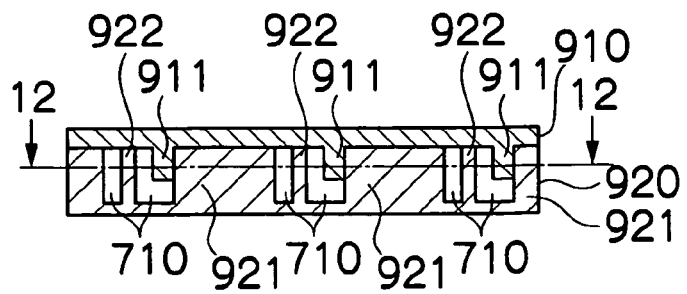
FIGS. 11A to 11F are vertical cross-sectional diagrams used for describing an embodiment of a process for manufacturing the spacer.
Figure 12A:
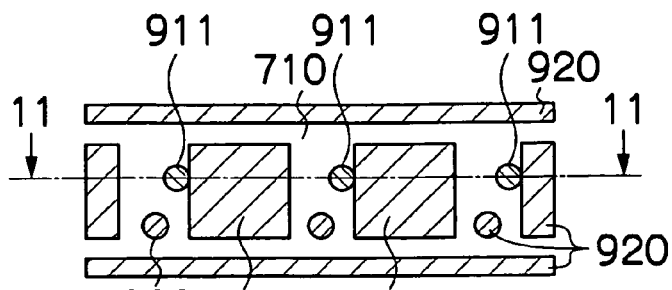
FIGS. 12A to 12F are horizontal cross-sectional diagrams used for describing the embodiment of the process for manufacturing the spacer.

Firstly, an upper mold 910 and lower mold 920 made of metal are prepared as forming molds, and the upper mold 910 and the lower mold 920 are assembled together (FIGS. 11A and 12A).

Here, the upper mold 910 has projecting parts 911 of the same shapes as the conducting parts 72 of the spacer 70, which is formed subsequently. When manufacturing the spacer 70b of the second example shown in FIG. 8B, the projecting parts 911 of the upper mold 910 have the same shapes as the substantially circular conducting parts 72b shown in FIG. 9B.

On the other hand, the lower mold 920 has first projecting parts 921 corresponding to the large opening parts (758 in FIG. 6) in the spacer 70 formed subsequently, and second projecting parts 922 corresponding to the through holes (753 in FIG. 6), each of which forms a portion of the flow channel from the common liquid chamber 55 to the pressure chamber 52.

Furthermore, the upper mold 910 and the lower mold 920 are assembled together in such a manner that the projecting parts 911 of the upper mold 910 abut against the side walls of the first projecting parts 921 of the lower mold 920.

When the upper mold 910 and the lower mold 920 have been combined in this fashion, then spaces 710 having substantially the same shape as the base plate 71 of the spacer 70 in FIG. 6 are formed between the upper mold 910 and the lower mold 920.

Figure 11B:
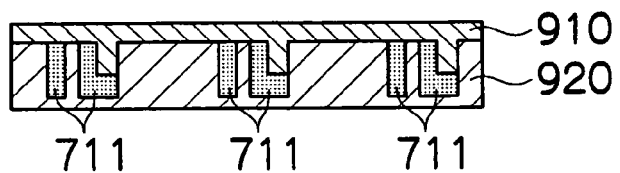
Figure 11C:
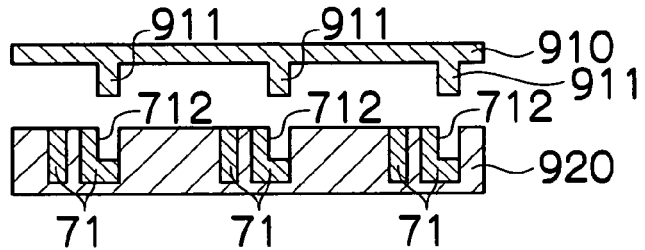
Figure 12B:
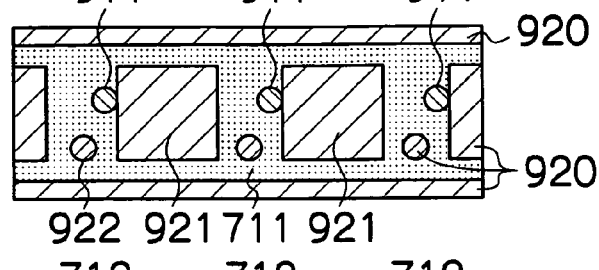
Figure 12C:
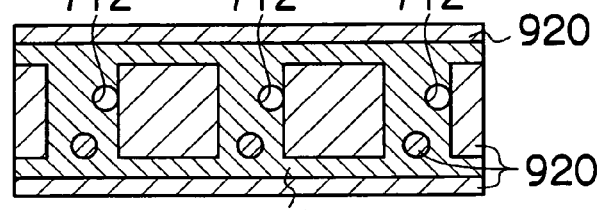

Insulating resin 711 is injected into the spaces 710 formed between the upper mold 910 and the lower mold 920 (FIGS. 11B and 12B).

The resin 711 injected into the spaces 710 between the lower mold 910 and the upper mold 920 cures, thereby forming the base plate 71 of the spacer 70, whereupon the upper mold 910 only is released. The base plate 71 has an upper surface and a bottom surface.

Thereupon, recess parts 712 corresponding to the conducting parts 72 of the spacer 70 in FIG. 6 are formed in the base plate 71 in the positions where the projecting parts 911 of the upper mold 910 have been removed.

In other words, the base plate (first member) 71 having side faces (702 in FIG. 7) in which the recess parts 712 are formed to correspond to the conducting parts 72 of the spacer 70, and the lower mold (second member) 920 having the flat surfaces abutting against the side faces (702 in FIG. 7) of the base plate 71, are prepared, thereby closing the first openings. The side faces intersect with the upper and bottom surface of the base plate 71. Here, the recess parts 712 have first openings on the side faces and second openings on the upper surface.

Figure 11D:
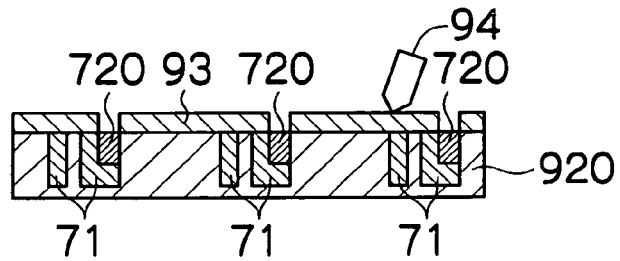
Figure 12D:
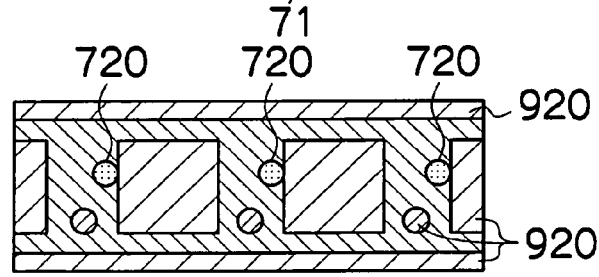

In the state where the flat surfaces of the lower mold 920 abut against the side faces of the base plate 71 having the recess parts 712, and the upper ends of the recess parts 712 only are open, a conductive paste 720 is filled into the recess parts 712 from the open ends of the recess parts 712 (FIGS. 11D and 12D).

More specifically, a screen 93 is formed on the upper surface of the base plate 71 so as to mask the portions other than the recess parts 712, and the conductive paste 720 is filled into the recess parts 712 from the open ends of the recess parts 712 of the base plate 71, by means of a squeegee 94. A thermally curable conductive paste, which is an epoxy resin including conductive particles, is used as the conductive paste 720, for instance.

Figure 11E:
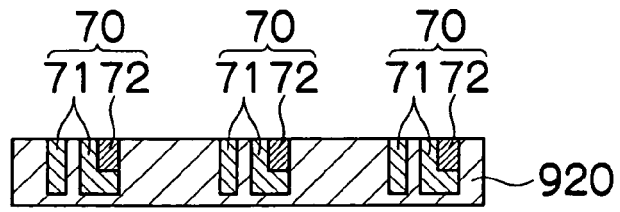
Figure 12E:
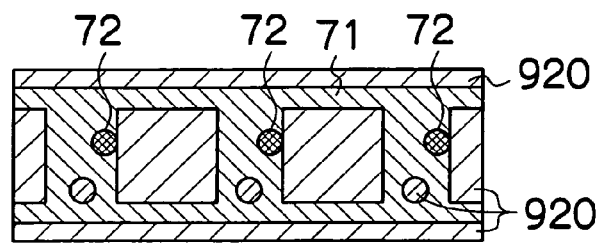

Then, the conductive paste 720 is cured. More specifically, if the conductive paste 720 is a thermally curable paste, then the conductive paste 720 is cured by heat treatment. For example, firstly, it is dried for 30 minutes at 80° C. in a preliminary drying process, whereupon it is heated for 60 minutes at 160° C. to perform main curing. In this way, the conducting parts 72 are formed by curing of the conductive paste 720 (FIGS. 11E and 12E).

Figure 11F:
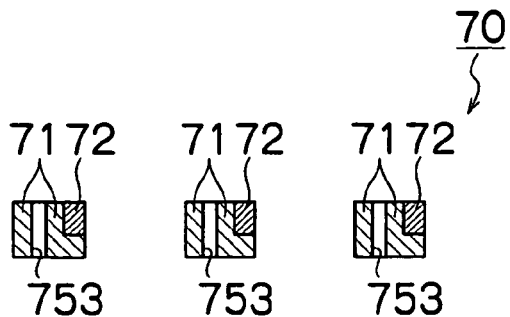
Figure 12F:
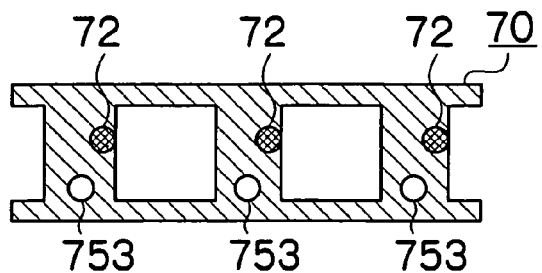

The lower mold 920 is then separated, and the spacer 70 comprising the base plate 71 and the conducting parts 72 is thus formed (FIGS. 11F and 12F).

As shown in FIG. 8B, the spacer 70 formed in this way has the upper end face 721 of the column-shaped conducting part 72 exposed on the upper face 701, and the side face 722 of the column-shaped conducting part 72 exposed on the side face 702.

If the spacer 72d having the rib 73 shown in FIG. 8D is formed, then the spacer 72d can be formed by means of a so-called three-mold composition, which uses three molds.

Method of Manufacturing Liquid Ejection Head

FIGS. 13A to 14C are illustrative diagrams for describing the sequence of an embodiment of a method of manufacturing the liquid ejection head 50.

Figure 13A:
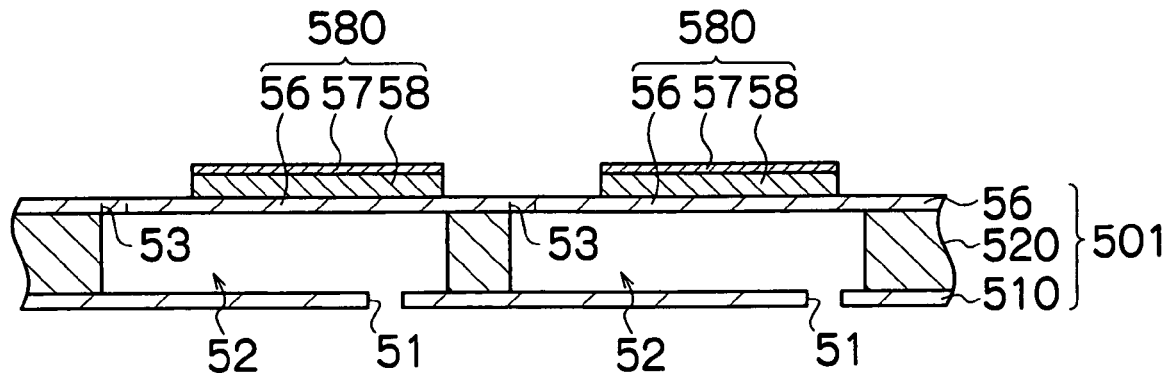
FIGS. 13A to 13C are vertical cross-sectional diagrams used for describing the first half of an embodiment of a process for manufacturing a liquid ejection head.

Firstly, a basic compositional body 501 is prepared, by bonding together the nozzle plate 510 in which the plurality of nozzles 51 are formed, the pressure chamber plate 520 in which the plurality of pressure chambers 52 connected respectively to the nozzles 51 are formed, and the diaphragm (actuator plate) 56 in which the actuators 580 for applying pressure to the liquid in the pressure chambers 52 are formed (FIG. 13A).

Figure 13B:
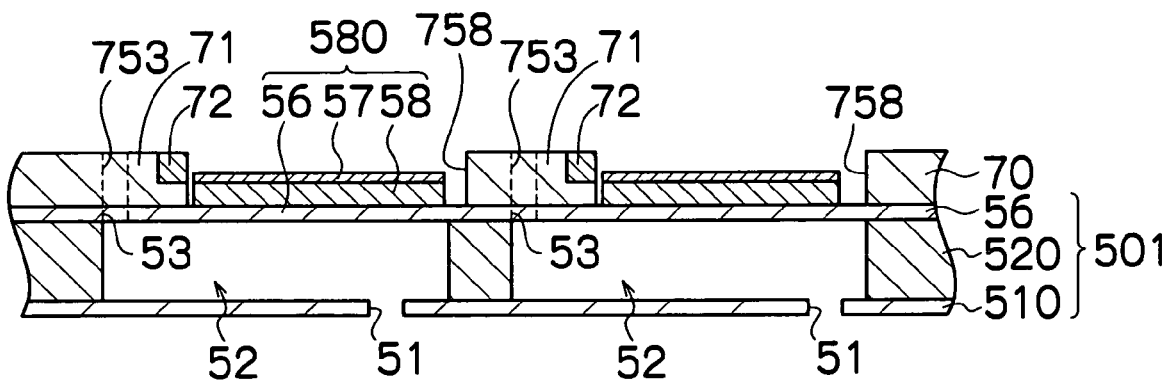

The spacer 70 manufactured by the method described in FIGS. 11A to 11F and FIGS. 12A to 12F is attached on the basic compositional body 501 (FIG. 13B). Here, the piezoelectric bodies 58 of the actuators 580 are disposed inside the large opening parts 758 of the spacer 70. Furthermore, the through holes 753 of the spacer 70 are aligned in position with the ink supply ports 53 of the pressure chambers 52.

Figure 13C:
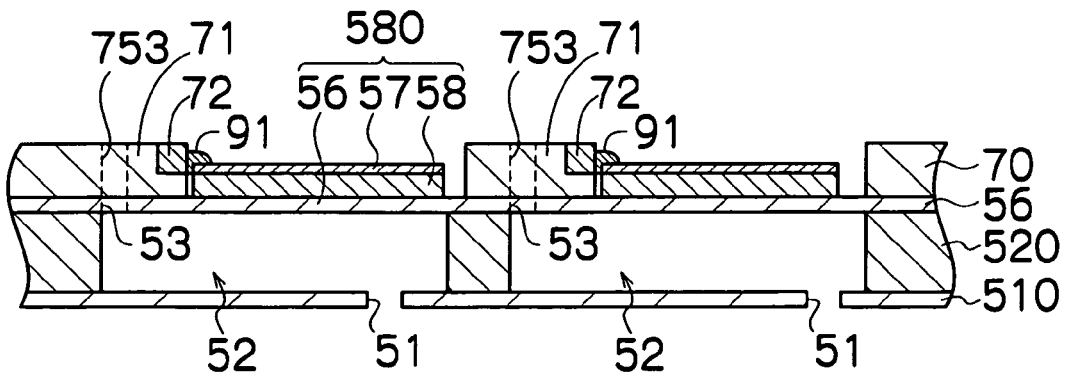

Thereupon, the individual electrodes 57 of the actuators 580 and the conducting parts 72 of the spacer 70 are bonded together by the conductive bonding material 91, such as solder (FIG. 13C). More specifically, as shown in FIG. 7, since the side faces 722 of the conducting parts 72 of the spacer 70 are exposed on the side faces 702 (the side walls defining the large opening parts 758) of the spacer 70, then the lower parts (lower electrodes) of the side faces 722 of the conducting parts 72 are bonded to the individual electrodes 57 of the actuators 580.

Figure 14A:
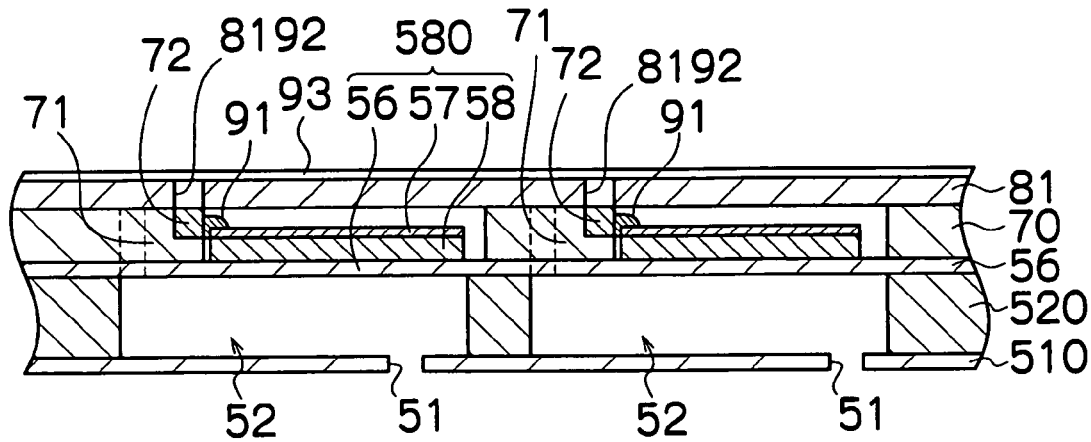
FIGS. 14A to 14C are vertical cross-sectional diagrams used for describing the second half of the embodiment of the process for manufacturing the liquid ejection head.

Subsequently, the horizontal wiring plate 81, in which the through holes 8153 are formed at positions corresponding to the upper electrodes (721 in FIG. 7) of the conducting parts 72 of the spacer 70, is bonded onto the upper face of the spacer 70 (FIG. 14A).

The horizontal wires (external wires) 93 are formed on the horizontal wiring plate 81, as shown in FIG. 3 as well.

Figure 14B:
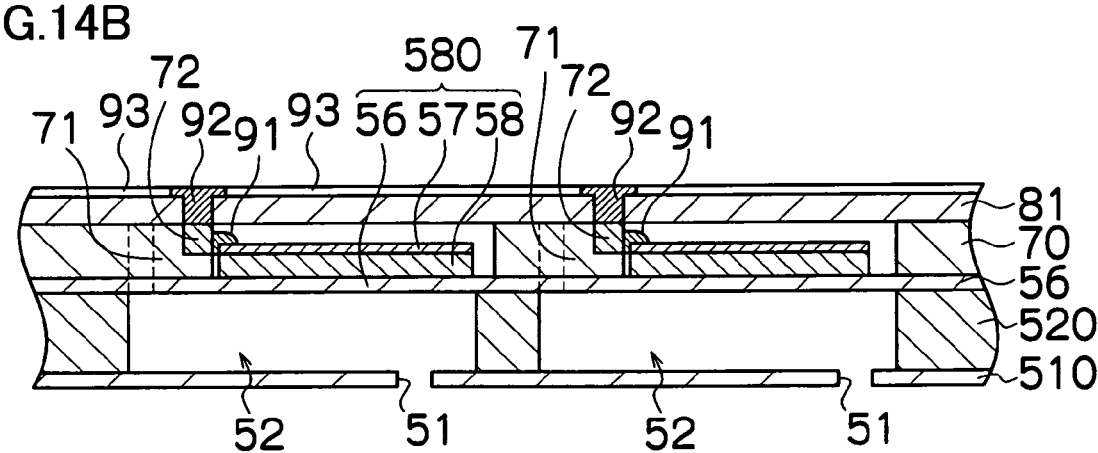

Next, the conductive paste 92 is filled into the through holes 8192 of the horizontal wiring plate 81, and the filled conductive paste 92 is cured (FIG. 14B).

Figure 14C:
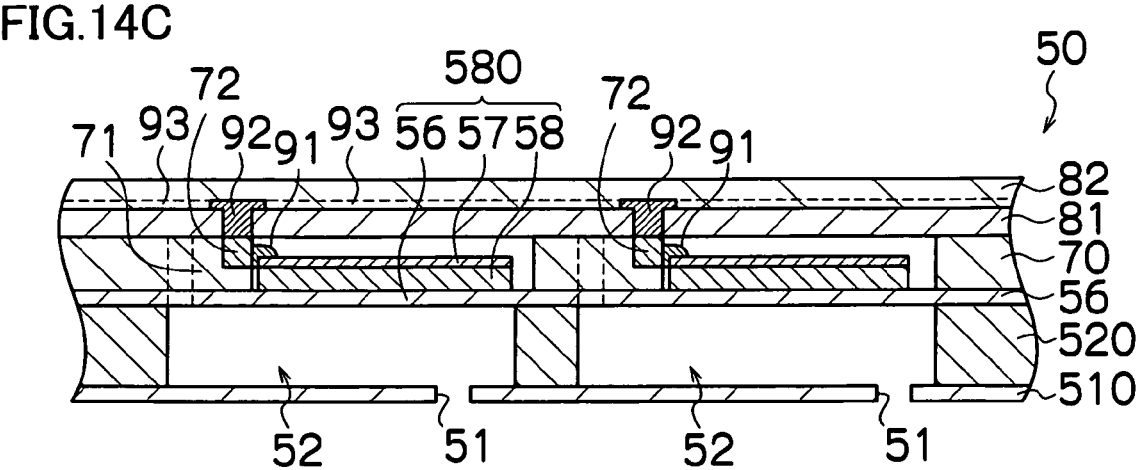

Accordingly, the horizontal wires 93 of the horizontal wiring plate 81, the conductive material 92 (the cured conductive paste) filled into the through holes 8192 of the horizontal wiring plate 81, the conducting parts 72 of the spacer 70, and the individual electrodes 57 of the actuators 580, are connected through the conductive bonding material 91, and when this laying out of the drive wires for the actuators 580 in the liquid ejection head 50 has been completed, then the protective plate 82 for protecting the horizontal wires 93 from the liquid in the common liquid chambers 55 is formed on top of the horizontal wiring plate 81 (FIG. 14C).

Figure 15:
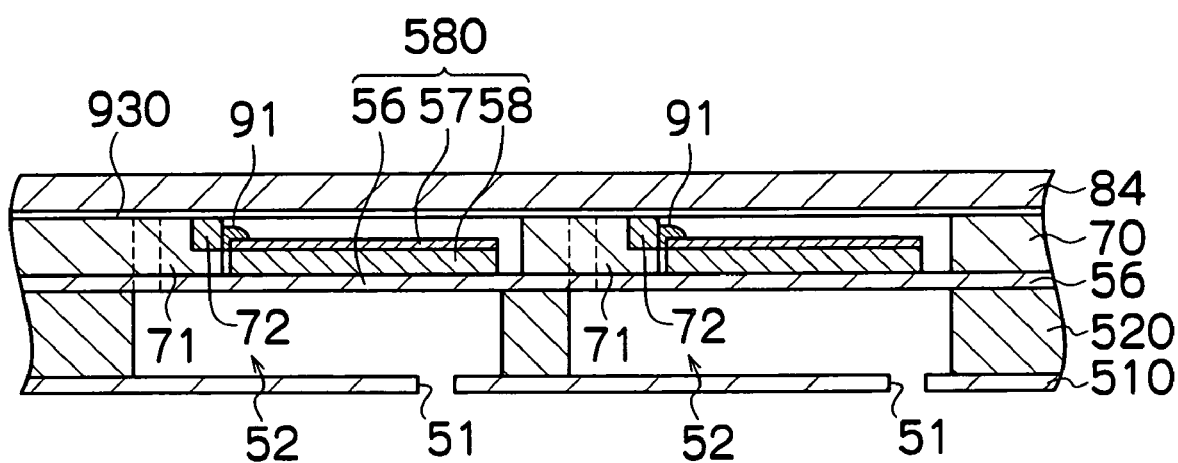
FIG. 15 is a vertical cross-sectional diagram of an embodiment of a liquid ejection head having a horizontal wiring plate in which horizontal wires are formed in recess parts of the bottom face thereof.

Instead of forming the horizontal wires (external wires) 93 on the upper face of the horizontal wiring plate 81, and forming the protective plate 82 on top of the horizontal wiring plate 81, as shown in FIG. 14C, it is also possible to install the horizontal wiring plate 84 having horizontal wires (external wires) 930 formed in recess parts in the bottom surface thereof, on top of the spacer 70, as shown in FIG. 15. In this case, the upper electrodes of the conducting parts 72 of the spacer 70 are bonded to the horizontal wires 930 formed on the bottom surface of the horizontal wiring plate 84.

Further Examples of External Wires

Figure 16:
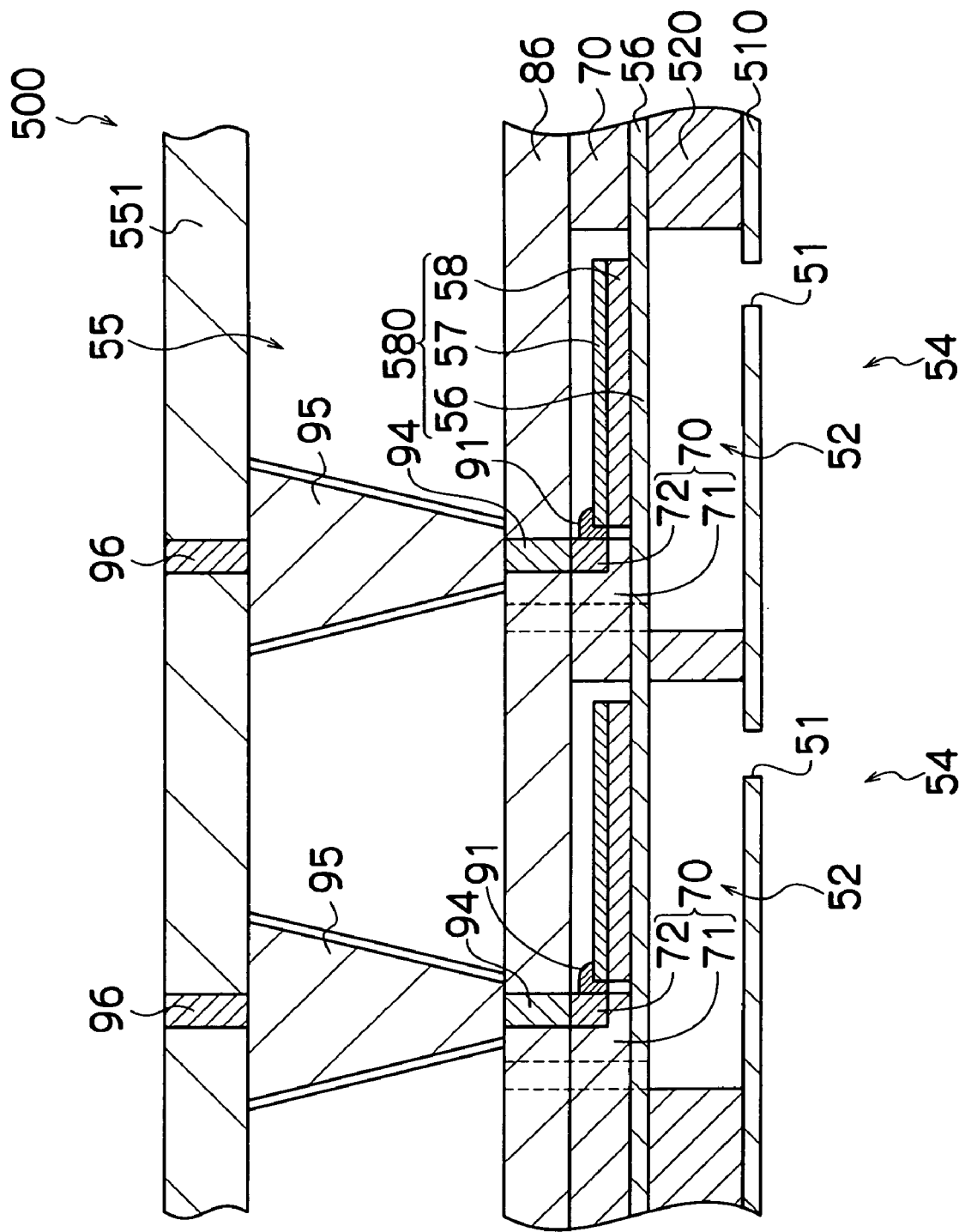
FIG. 16 is a vertical cross-section diagram of an embodiment of a liquid ejection head having column-shaped wires which pass through the interior of the common liquid chamber.
Figure 17:
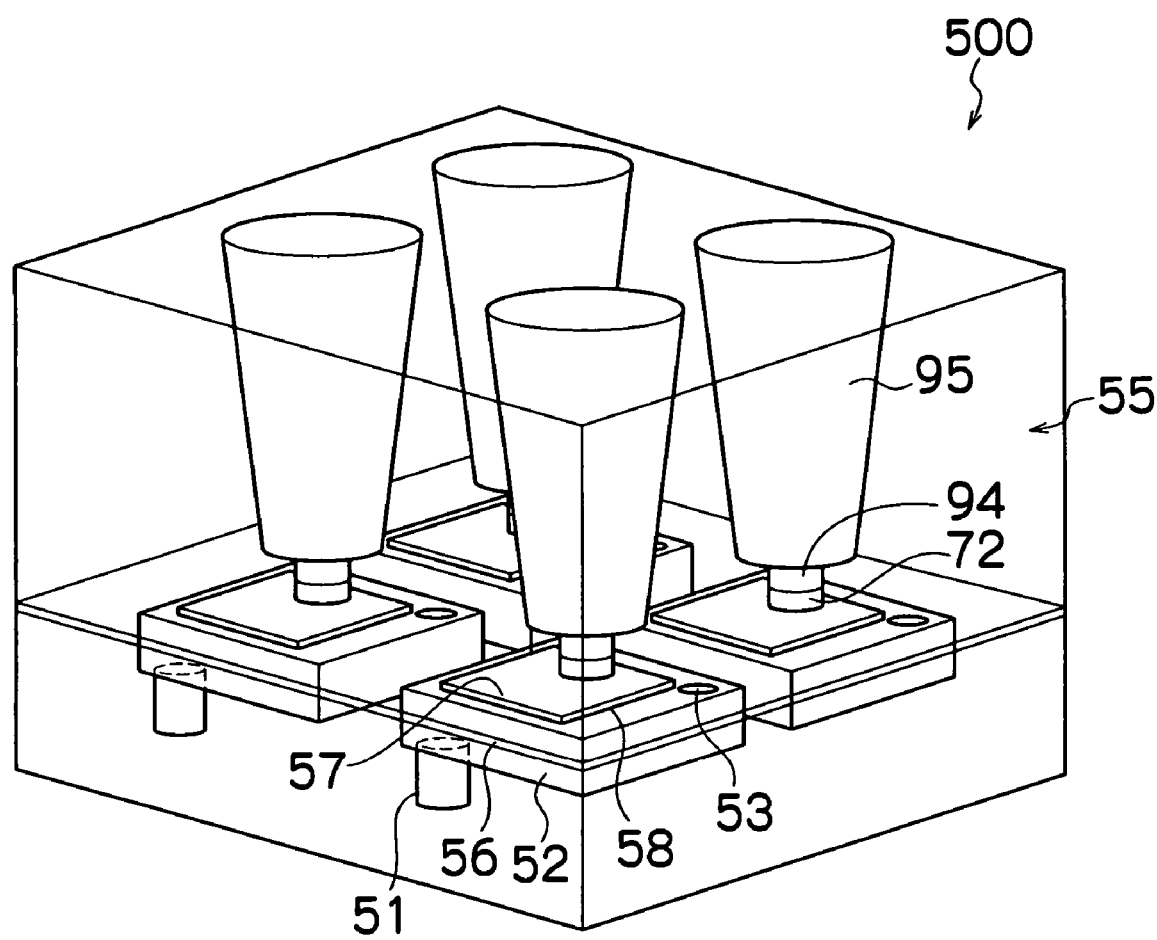
FIG. 17 is an illustrative diagram for describing the column-shaped wires in FIG. 16.

FIG. 16 is a cross-sectional diagram of a liquid ejection head 500 provided with column-shaped wires 95 (also referred to as electrical columns) that pass through the common liquid chamber 55. FIG. 17 is an oblique perspective diagram aimed at providing an easier understanding of the column-shaped wires 95 passing through the common liquid chamber 55.

Of the constituent elements of the liquid ejection head 500 shown in FIGS. 16 and 17, constituent elements that are the same as the constituent elements of the liquid ejection head 50 shown in FIG. 4 are denoted with the same reference numerals, and detailed description thereof is omitted here.

In FIG. 16, drive signals from outside the liquid ejection head 50 are supplied respectively to the individual electrodes 57 of the actuators 580, through vertical wires 96 passing through the ceiling plate 551 of the common liquid chamber 55 in the thickness direction, column-shaped wires 95 passing through the common liquid chamber 55 in the vertical direction, the vertical wires 94 passing through the protective plate 86 protecting the actuators 580 in the thickness direction thereof, the conducting parts 72 of the spacer 70, and the conductive bonding members 91 connecting the conducting parts 72 of the spacer 70 with the individual electrodes 57 of the actuators 580.

When the liquid ejection head 500 shown in FIG. 16 is compared with the liquid ejection head 50 shown in FIG. 4, then the wires (external wires) between the conducting parts 72 of the spacer 70 and the exterior of the liquid ejection head 50 are constituted by the horizontal wires 93 laid horizontally with respect to the installation surface of the piezoelectric bodies 58 in the liquid ejection head 50 in FIG. 4, and the liquid ejection head 500 shown in FIG. 16 is different in that the wires (external wires) between the conducting parts 72 of the spacer 70 and the exterior of the liquid ejection head 500 are constituted by the wires 94, 95 and 96 formed in the substantially vertical direction with respect to the installation surface of the piezoelectric bodies 58.

The foregoing shows the examples of cases where the common liquid chamber 55 is arranged on the rear surface of the pressure chambers 52, but the present invention is not limited to a case such as this.

Figure 18:
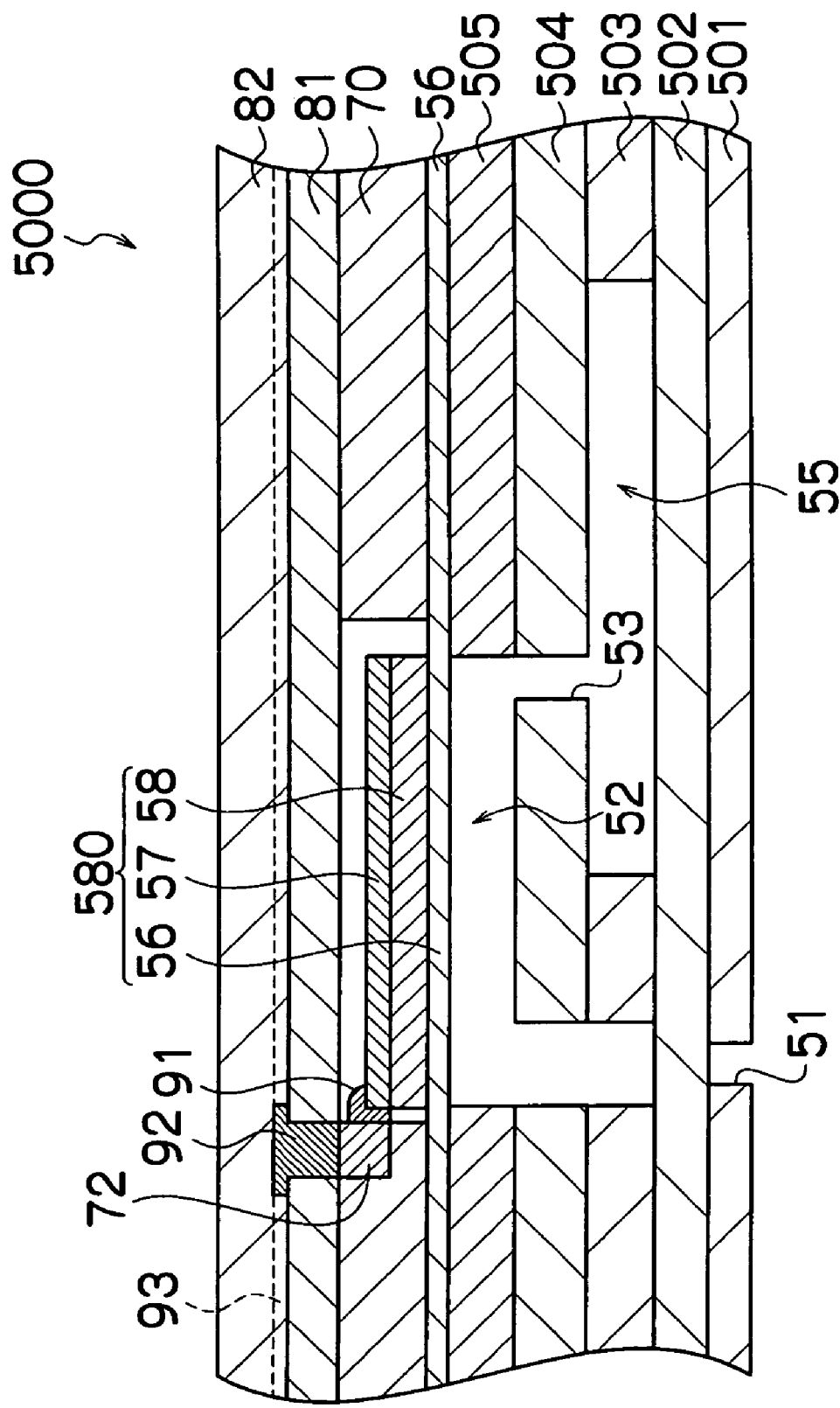
FIG. 18 is a cross-sectional diagram showing the internal structure of an embodiment of a liquid ejection head.

A liquid ejection head 5000 shown in FIG. 18 is formed by bonding together, in order, a nozzle plate 501 formed with the nozzles 51, a first intermediate plate 502, a common liquid chamber plate 503 formed with the common liquid chamber 55, a second intermediate plate 504, a pressure chamber plate 505 formed with the pressure chambers 52, the diaphragm (actuator plate) 56 formed with the actuators 580, the spacer 70, the horizontal wiring substrate 81, and the protective plate 82.

Of the constituent elements of the liquid ejection head 5000 shown in FIG. 18, the constituent elements that are the same as the constituent elements of the liquid ejection head 50 shown in FIG. 4 are denoted with the same reference numerals, and detailed description thereof is omitted here.

In FIG. 18, a drive signal from outside the liquid ejection head 50 is supplied to the individual electrode 57 of the actuator 580 through the horizontal wire 93 on the horizontal wiring plate 81, the conductive material 92 passing through the horizontal wiring plate 81 in the thickness direction (vertical direction), the conducting part 72 of the spacer 70, and the conductive bonding member 91 connecting the conducting part 72 of the spacer 70 with the individual electrode 57 of the actuator 580.

Image Forming Apparatus

Figure 19:
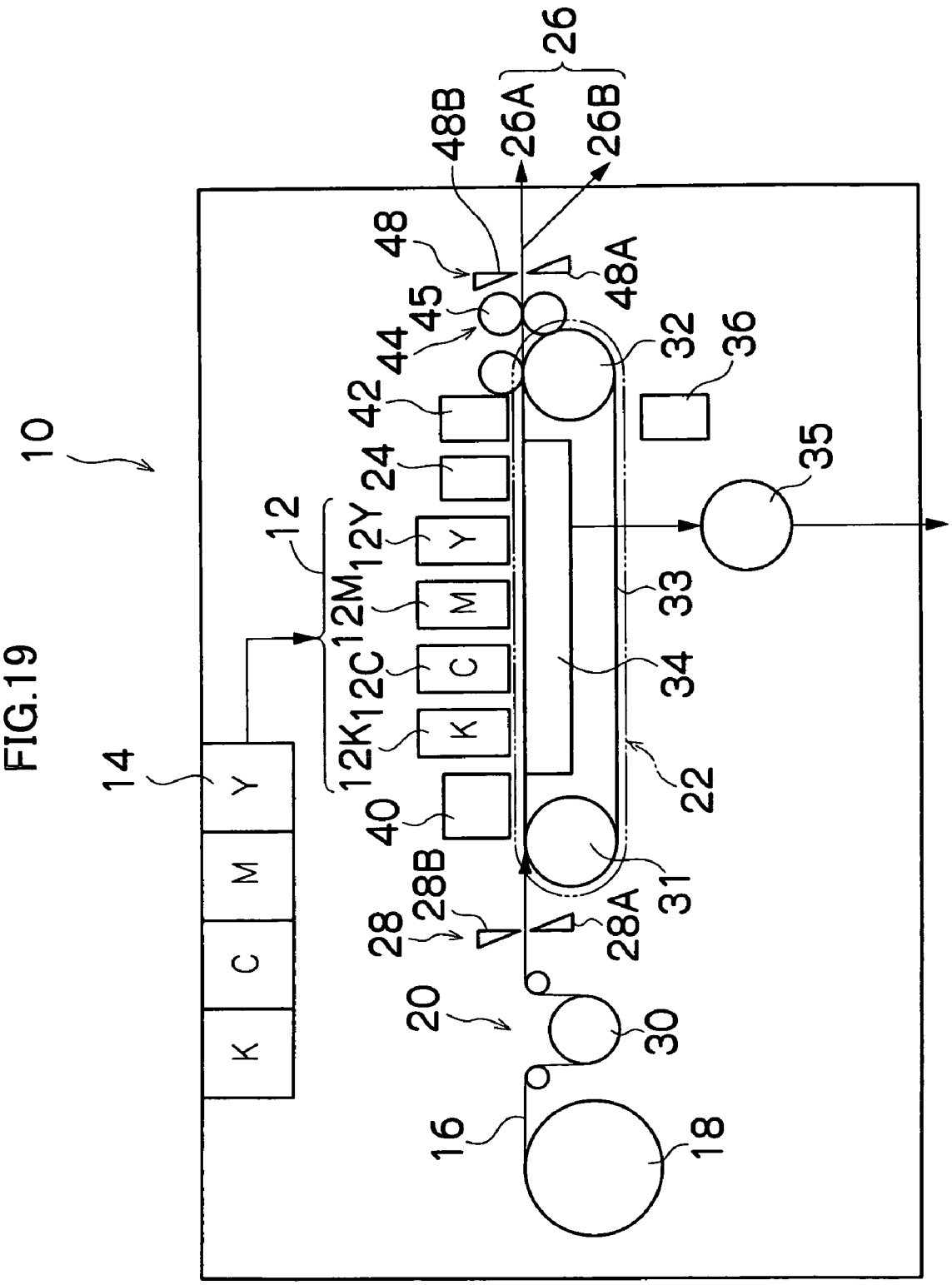
FIG. 19 is a general schematic drawing showing a general view of an image forming apparatus.

FIG. 19 is a general schematic drawing showing a general view of an image forming apparatus.

As shown in FIG. 19, the image forming apparatus 10 comprises: an ink ejection unit 12 having a plurality of ink ejection heads 12K, 12C, 12M, and 12Y for respective ink colors; an ink storing and loading unit 14 for storing inks to be supplied to the ink ejection heads 12K, 12C, 12M, and 12Y; a paper supply unit 18 for supplying recording paper 16; a decurling unit 20 for removing curl in the recording paper 16; a belt conveyance unit 22 disposed facing the nozzle face (ink droplet ejection face) of the ink ejection unit 12, for conveying the recording paper 16 while keeping the recording paper 16 flat; a print determination unit 24 for reading the result of the printing produced by the ink ejection unit 12; and a paper output unit 26 for outputting printed recording paper to the exterior.

In FIG. 19, a supply of rolled paper (continuous paper) is displayed as one example of the paper supply unit 18, but it is also possible to use a supply unit which supplies cut paper that has been cut previously into sheets. In a case where rolled paper is used, a cutter 28 is provided, as shown in FIG. 19. The cutter 28 comprises a fixed blade 28A and a circular blade 28B which moves along this fixed blade 28A. The recording paper 16 delivered from the paper supply unit 18 generally retains curl. In order to remove this curl, heat is applied to the recording paper 16 in the decurling unit 20 by a heating drum 30 in the direction opposite to the direction of the curl. After decurling in the decurling unit 24, the cut recording paper 16 is delivered to the belt conveyance unit 22.

The suction belt conveyance unit 22 has a configuration in which an endless belt 33 is set around rollers 31 and 32 so that the portion of the endless belt 33 facing at least the nozzle face of the ink ejection unit 12 and the sensor face of the print determination unit 24 forms a horizontal plane (flat plane). The belt 33 has a width that is greater than the width of the recording paper 16, and a plurality of suction apertures (not shown) are formed on the belt surface. A suction chamber 34 is disposed in a position facing the sensor surface of the print determination unit 24 and the nozzle surface of the ink ejection unit 12 on the interior side of the belt 33, which is set around the rollers 31 and 32, as shown in FIG. 19; and this suction chamber 34 provides suction with a fan 35 to generate a negative pressure, thereby holding the recording paper 16 onto the belt by suction. The belt 33 is driven in the clockwise direction in FIG. 19 by the motive force of a motor (not illustrated) being transmitted to at least one of the rollers 31 and 32, which the belt 33 is set around, and the recording paper 16 held on the belt 33 is conveyed from left to right in FIG. 19. Since ink adheres to the belt 33 when a marginless print or the like is formed, a belt cleaning unit 36 is disposed in a predetermined position (a suitable position outside the print region) on the exterior side of the belt 33. A heating fan 40 is provided on the upstream side of the ink ejection unit 12 in the paper conveyance path formed by the belt conveyance unit 22. This heating fan 40 blows heated air onto the recording paper 16 before printing, and thereby heats up the recording paper 16. Heating the recording paper 16 immediately before printing has the effect of making the ink dry more readily after landing on the paper.

Figure 20:
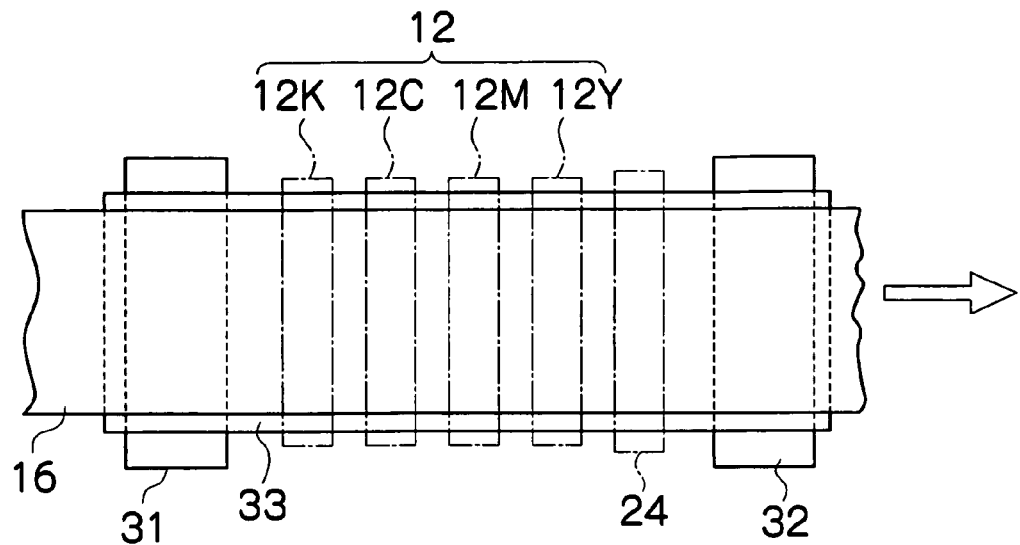
FIG. 20 is a principal cross-sectional diagram showing the periphery of an ink ejection section of the image forming apparatus in FIG. 19.

FIG. 20 is a principal plan diagram showing the periphery of the ink ejection unit 12 of the image forming apparatus 10.

As shown in FIG. 20, the ink ejection unit 12 is a so-called "full line head" in which a line head having a length corresponding to the maximum paper width is arranged in a direction (main scanning direction) that is perpendicular to the medium conveyance direction (sub-scanning direction). More specifically, the respective ink ejection heads 12K, 12C, 12M and 12Y are line heads which each have a plurality of nozzles (ejection ports) arranged through a length exceeding at least one edge of the maximum size of recording paper 16 intended for use with the image forming apparatus 10.

The ink ejection heads 12K, 12C, 12M and 12Y corresponding to respective ink colors are disposed in the order, black (K), cyan (C), magenta (M) and yellow (Y), from the upstream side (left-hand side in FIG. 20), following the direction of conveyance of the recording paper 16 (the medium conveyance direction). A color print can be formed on the recording paper 16 by ejecting the inks from the ink ejection heads 12K, 12C, 12M and 12Y, respectively, onto the recording paper 16, while conveying the recording paper 16.

The ink ejection unit 12, in which the full-line heads covering the entire width of the paper are thus provided for the respective ink colors, can record an image over the entire surface of the recording paper 16 by performing the action of moving the recording paper 16 and the ink ejection unit 12 relative to each other in the medium conveyance direction (sub-scanning direction) just once (in other words, by means of a single sub-scan). Higher-speed printing is thereby made possible and productivity can be improved in comparison with a shuttle type head configuration in which an ink ejection head moves reciprocally in a direction (main scanning direction) which is perpendicular to the medium conveyance direction (sub-scanning direction).

Here, the terms main scanning direction and sub-scanning direction are used in the following senses. More specifically, in a full-line head comprising rows of nozzles that have a length corresponding to the entire width of the recording paper, "main scanning" is defined as printing one line (a line formed of a row of dots, or a line formed of a plurality of rows of dots) in the breadthways direction of the recording paper (the direction perpendicular to the conveyance direction of the recording paper) by driving the nozzles in one of the following ways: (1) simultaneously driving all the nozzles; (2) sequentially driving the nozzles from one side toward the other; and (3) dividing the nozzles into blocks and sequentially driving the blocks of the nozzles from one side toward the other. The direction indicated by one line recorded by a main scanning action (the lengthwise direction of the band-shaped region thus recorded) is called the "main scanning direction".

On the other hand, "sub-scanning" is defined as to repeatedly perform printing of one line (a line formed of a row of dots, or a line formed of a plurality of rows of dots) formed by the main scanning, while moving the full-line head and the recording paper relative to each other. The direction in which sub-scanning is performed is called the sub-scanning direction. Consequently, the conveyance direction of the recording paper is the sub-scanning direction and the direction perpendicular to same is called the main scanning direction.

Although a configuration with the four standard colors, K, C, M and Y, is described in the present embodiment, the combinations of the ink colors and the number of colors are not limited to those of the present embodiment, and light and/or dark inks can be added as required. For example, a configuration is possible in which ink ejection heads for ejecting light-colored inks such as light cyan and light magenta are added.

As shown in FIG. 19, the ink storing and loading unit 14 has ink tanks for storing inks of the colors corresponding to the respective ink ejection heads 12K, 12C, 12M and 12Y, and each ink tank is connected to a respective ink ejection head 12K, 12C, 12M, 12Y, through a tube channel (not illustrated).

The print determination unit 24 has an image sensor (line sensor, or the like) for capturing an image of the ejection result of the ink ejection unit 12, and functions as a device to check for ejection defects such as blockages of the nozzles in the print unit 12 on the basis of the image read in by the image sensor.

A post-drying unit 42 is provided at a downstream stage from the print determination unit 24. The post-drying unit 42 is a device for drying the printed image surface, and it may comprise, for example, a heating fan. A heating and pressurizing unit 44 is provided at a stage following the post-drying unit 42. The heating and pressurizing unit 44 is a device which serves to control the luster of the image surface, and it applies pressure to the image surface by means of pressure rollers 45 having prescribed surface undulations, while heating same. Accordingly, an undulating form is transferred to the image surface.

The printed object generated in this manner is output through the paper output unit 26. In the inkjet recording apparatus 10, a sorting device (not shown) is provided for switching the outputting pathway in order to sort the printed matter with the target print and the printed matter with the test print, and to send them to output units 26A and 26B, respectively. If the main image and the test print are formed simultaneously in a parallel fashion, on a large piece of printing paper, then the portion corresponding to the test print is cut off by means of the cutter (second cutter) 48. The cutter 48 is disposed immediately in front of the paper output section 26, and serves to cut and separate the main image from the test print section, in cases where a test image is printed onto the white margin of the image. The structure of the cutter 48 is similar to that of the first cutter 28 described previously, being constituted by a fixed blade 48B and a circular blade 48A. Moreover, although omitted from the drawing, a sorter for collating and stacking the images according to job orders is provided in the paper output section 26A corresponding to the main images.

The ink ejection heads 12K, 12M, 12C and 12Y provided for the respective ink colors in FIG. 19 have a common structure, and a reference numeral 50 is hereinafter designated to a representative example of these ink ejection heads.

Figure 21:
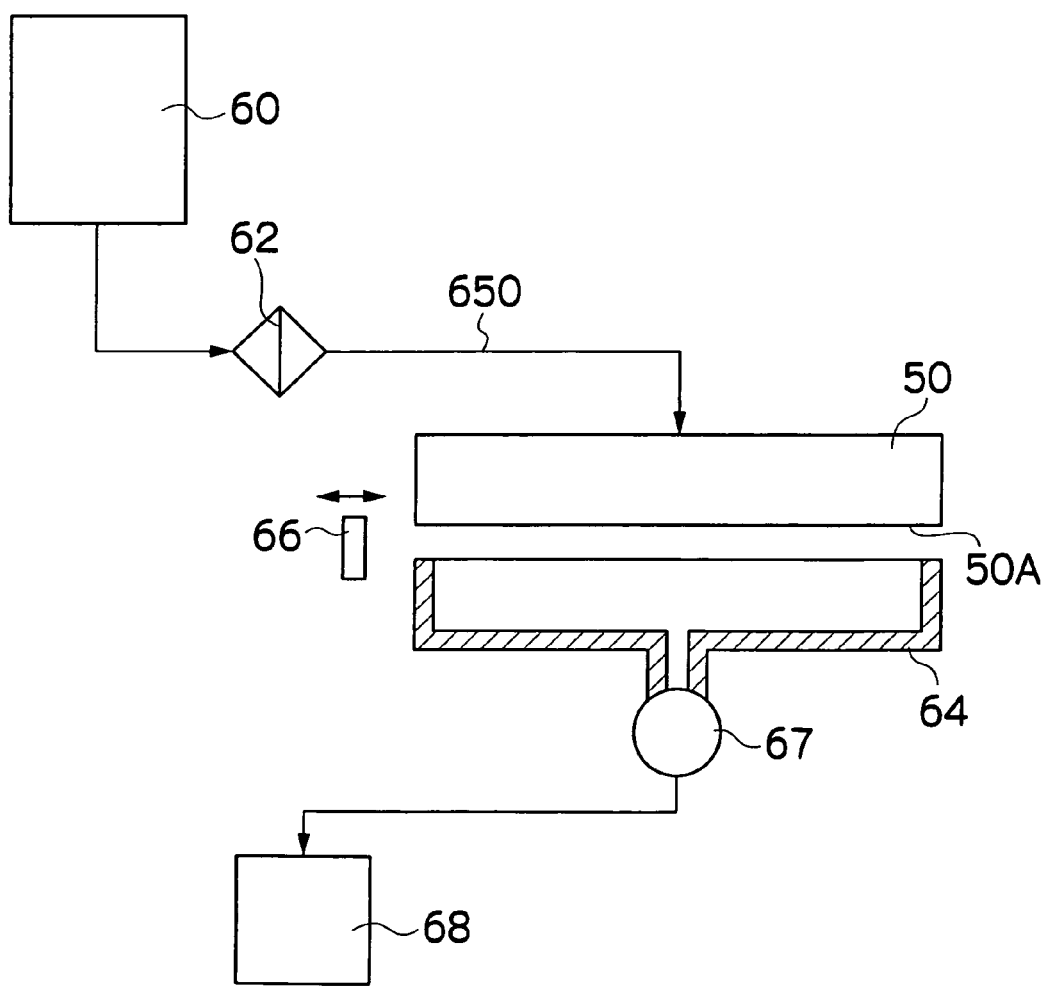
FIG. 21 is an illustrative diagram showing an approximate view of the composition of an ink supply system of the image forming apparatus in FIG. 19.

FIG. 21 is a conceptual diagram showing the composition of an ink supply system in the image forming apparatus 10.

The ink tank 60 is a base tank for supplying ink to the liquid ejection head 50, and this ink tank 60 constitutes the ink storing and loading unit 14 shown in FIG. 19. The mode of the ink tank 60 may adopt a system for replenishing ink by means of a replenishing port (not illustrated), or a cartridge system in which cartridges are exchanged independently for each ink tank 60, whenever the residual amount of ink has become low. If the type of ink is changed in accordance with the type of application, then a cartridge based system is suitable. In this case, desirably, the ink type is identified by means of a bar code, or the like, and the ejection of the ink is controlled in accordance with the ink type.

As shown in FIG. 21, a filter 62 for eliminating foreign material and bubbles is provided at an intermediate position of the tubing 650 (ink supply channel) which connects the ink tank 60 with the liquid ejection head 50. Desirably the mesh size of the filter 62 is equal to or less than the diameter of the nozzles 51 of the liquid ejection head 50.

Furthermore, the image forming apparatus 10 comprises a cap 64 forming a device for preventing drying of the meniscus of the nozzles 51 or preventing increase in the ink viscosity in the vicinity of the meniscus, and a cleaning blade 66 forming a device for cleaning the nozzle surface 50A.

A maintenance unit including the cap 64 and the cleaning blade 66 can be moved in a relative fashion with respect to the liquid ejection head 50 by a movement mechanism (not shown), and is moved from a predetermined holding position to a maintenance position below the liquid ejection head 50 as required.

Furthermore, the cap 64 is raised and lowered in a relative fashion with respect to the print head 50 by an elevator mechanism (not shown). The elevator mechanism raises the cap 64 to a predetermined elevated position so as to come into close contact with the liquid ejection head 50, and at least the nozzle region of the nozzle surface 50A is thus covered by the cap 64.

Moreover, desirably, the inside of the cap 64 is divided by means of partitions into a plurality of areas corresponding to the nozzle rows, thereby achieving a composition in which suction can be performed selectively in each of the demarcated areas, by means of a selector, or the like.

The cleaning blade 66 is composed of rubber or another elastic member, and can slide on the ink ejection surface (nozzle surface 50A) of the liquid ejection head 50 by means of a cleaning blade movement mechanism (not shown). If there are ink droplets or foreign matter adhering to the nozzle surface 50A, then the nozzle surface 50A is wiped by causing the cleaning blade 66 to slide over the nozzle surface 50A, thereby cleaning same.

A suction pump 67 suctions ink from the nozzles 51 of the liquid ejection head 50 and sends the suctioned ink to a recovery tank 68 in a state where the nozzle surface 50A of the liquid ejection head 50 is covered by the cap 64.

A suction operation of this kind is carried out when ink is filled into the liquid ejection head 50 from the ink tank 60 when the ink tank 60 is installed in the image forming apparatus 10 (initial filling), and it is also carried out when removing ink of increased viscosity after the apparatus has been out of use for a long period of time (start of use after long period of inactivity).

In other words, when a state in which ink is not ejected from the liquid ejection head 50 continues, the ink solvent in the vicinity of the nozzles 51 evaporates and the ink viscosity in the vicinity of the nozzles 51 increases. In such a state, ink can no longer be ejected from the nozzles 51 even when the actuators 580 for driving ejection are operated. Therefore, before reaching a state of this kind (namely, within a viscosity range where ink ejection is still possible by means of the operation of the ejection driving actuators), a dummy ejection is performed in order to eject the ink of increased viscosity in the vicinity of the nozzles 51, toward the cap 64. Furthermore, after cleaning away soiling on the surface of the nozzle surface 50A by means of a wiper, such as a cleaning blade 66, provided as a cleaning device on the nozzle surface 50A, a dummy ejection is also carried out in order to prevent infiltration of foreign matter into the nozzles 51 due to the rubbing action of the wiper. The dummy ejection is also referred to as "purge", "liquid ejection", and so on. In particular, a dummy ejection carried out before printing, as described above, is called "preliminary ejection".

Here, to categorize the types of ejection performed from the nozzles 51, there is, firstly, normal ejection performed onto the recording medium in order to form an image on the recording medium, such as paper, and secondly, dummy ejection performed onto the cap 64, using the cap 64 as an ink receptacle.

Furthermore, if there are bubbles inside the nozzles 51 and pressure chambers 52 of the liquid ejection head 50, or if the increase in the viscosity of the ink inside the nozzles 51 exceeds a certain level, then it becomes impossible to eject ink from the nozzles 51 in the aforementioned dummy ejection operation, and therefore, the cap 64 abuts against the nozzle surface 50A of the liquid ejection head 50, and a operation is performed to suction out the ink containing bubbles or the ink of increased viscosity inside the pressure chambers 52 of the liquid ejection head 50, by means of the suction pump 67.

Figure 22:
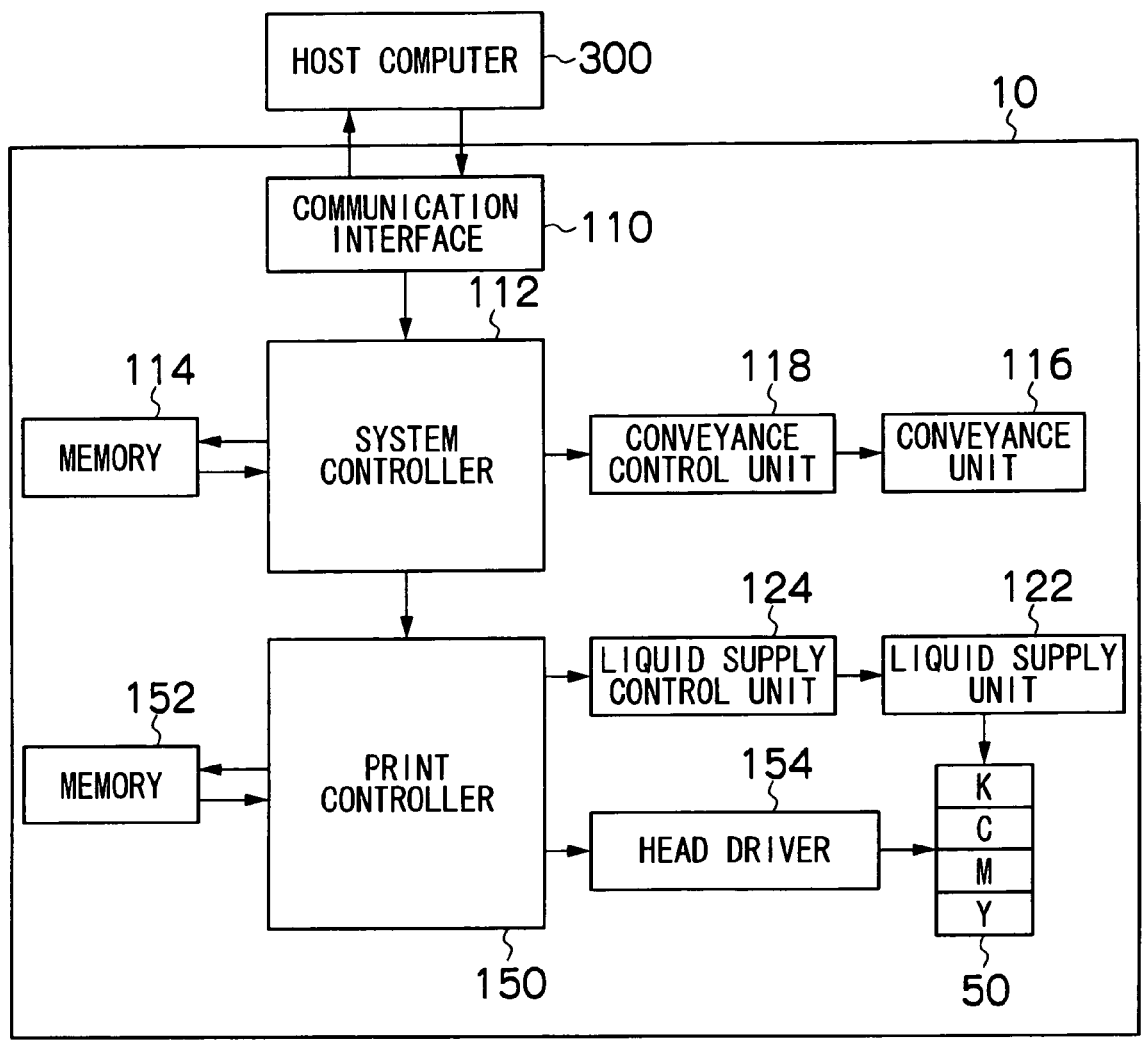
FIG. 22 is a block diagram showing an embodiment of the composition of the image forming apparatus.

FIG. 22 is a block diagram showing an example of the composition of an image forming apparatus 10.

In FIG. 22, the image forming apparatus 10 chiefly comprises: a liquid ejection head 50, a communication interface 110, a system controller 112, memories 114, 152, a conveyance unit 116, a conveyance control unit 118, a liquid supply unit 122, a liquid supply control unit 124, a print controller 150, and a head driver 154 (drive unit).

In the present embodiment, the liquid ejection heads 50 are provided respectively for the ink colors, of K (black), C (cyan), M (magenta), and Y (yellow).

The communication interface 110 is an image data input device for receiving image data transmitted by a host computer 300. For the communication interface 10, a wired or wireless interface, such as a USB (Universal Serial Bus), IEEE 1394, Ethernet, or the like, can be used.

Image data sent from a host computer 300 is read into the image forming apparatus 10 through the communication interface 110, and is stored temporarily in the first memory 114.

The system controller 112 is constituted by a central processing unit (CPU) and peripheral circuits thereof, and the like, and it forms a main control device which controls the whole of the image forming apparatus 10 in accordance with a prescribed program. More specifically, the system controller 112 controls the respective units of the communication interface 110, the conveyance control unit 118, the print control unit 150, and the like.

The conveyance unit 116 is constituted by a conveyance system motor, or the like. The conveyance system motor is a motor which applies a motive force to the rollers, belt, or the like, for conveying the recording medium, for example.

The conveyance control unit 118 is constituted by a motor driver, or the like. The motor driver is a driver (drive circuit) which drives the motor of the conveyance unit 116 in accordance with instructions from the system controller 112.

The liquid supply unit 122 is constituted by an ink tank forming an ink storage device for storing ink, and a channel and pump, or the like, which causes ink to flow from the ink tank to the liquid ejection head 50.

The liquid supply control unit 124 controls the supply of ink to the liquid ejection head 50 by using the liquid supply unit 122, in accordance with instructions from the system controller 112.

The print controller 150 functions as an image processing device which generates dot data for the respective ink colors on the basis of the image data input to the image forming apparatus 10. More specifically, the print controller 150 is a control unit which performs various image treatment processes, corrections, and the like, in accordance with the control implemented by the system controller 112, in order to generate dot data for controlling ink ejection, from the image data inside the first memory 114, and it supplies the data (dot data) thus generated to the head driver 154.

The second memory 152 is provided in the print controller 150 as an image buffer memory, and image data, parameters, and other data are temporarily stored in the second memory 152 when the image is processed in the print controller 150. In FIG. 1, the second memory 152 is depicted as being attached to the print controller 150; however, it may also be combined with the first memory 114. Also possible is a mode in which the print controller 150 and the system controller 112 are integrated to form a single processor.

To give a general description of the sequence of processing from the input of image data to image formation, the image data input externally by means of the communication interface 110 is accumulated in the first memory 114. An image which appears to have a continuous tonal graduation to the human eye is formed on the recording medium by changing the droplet ejection density and the dot size of fine dots created by ink (coloring material), and therefore, it is necessary to convert the input image data into dot data which reproduces the tonal gradations of the image (namely, the light and shade toning of the image) as faithfully as possible. Therefore, image data stored in the image memory 114 is sent to the print controller 150 through the system controller 112, and is converted into dot data for each ink color by a digital halftoning technique, using dithering, error diffusion, or the like, in the print controller 150.

In other words, the print controller 150 performs processing for converting the input original image data into dot data for the four colors of K, C, M and Y. The dot data generated by the print controller 150 in this way is stored in the second memory 152.

The head driver 154 outputs a drive signal for driving the liquid ejection head 50 on the basis of the dot data supplied by the print controller 150 (in other words, the dot data stored in the second memory 152).

By supplying the drive signals output from the head driver 154 to the liquid ejection heads 50, ink is ejected from the liquid ejection heads 50 onto the recording medium. By controlling ink ejection from the liquid ejection heads 50 in synchronization with the conveyance speed of the recording paper, a prescribed image is formed on the recording paper.

If the liquid ejection head 50 is composed as shown in FIG. 4, then the drive signals output by the head driver 154 are supplied to the individual electrodes 57 of the actuators 580 through the horizontal wires 93 (external wires) connected to the head driver 154, the conducting parts 72 of the spacer 70, which are connected to the horizontal wires 93 through the conductive material 92, and the conductive bonding members 91, as shown in FIG. 4.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of manufacturing a substrate, comprising the steps of:
preparing a first member and a second member, the first member having a non-side face which is one of a top face and a bottom face of the first member, the first member having side faces which intersect with the non-side face and have recess parts, the recess parts having first openings on the side faces and second openings on the non-side face, the second member having flat surfaces;
in a state where the flat surfaces of the second member are in contact with the side faces of the first member so that the first openings of the recess parts are closed with the flat surfaces of the second member while the second openings of the recess parts are open, filling conductive paste into the recess parts from the second openings of the recess parts;
curing the conductive paste filled in the recess parts; and
separating the second member from the first member on which conducting parts are formed from the cured conductive paste,
wherein portions of first exposed surfaces of the conducting parts that are exposed at the side faces of the first member through the first openings of the recess parts are used as first electrodes, and portions of second exposed surfaces of the conducting parts that are exposed at the non-side face of the first member through the second openings of the recess parts are used as second electrodes.

2. The method as defined in claim 1, wherein:
the second member is a forming mold; and
the first member is a molded object made of resin formed by using at least the second member.

3. The method as defined in claim 1, wherein the recess parts have no openings on another non-side face which is another of the top face and the bottom face of the first member.

4. The method as defined in claim 1, wherein the first openings of the recess parts are rectangular, the second openings of the recess parts are semicircular, and the recess parts are semi-cylindrical.

5. The method as defined in claim 1, wherein the first openings of the recess parts are rectangular, the second openings of the recess parts have a shape of a portion of a circle having a diameter greater than a breadth of the first openings, and the recess parts have a shape of a portion of a cylinder.

6. The method as defined in claim 1, wherein the first member has opening parts, and the side faces are inner faces defining the opening parts.

7. The method as defined in claim 6, wherein the opening parts have a shape corresponding to a shape of piezoelectric actuators, and the first electrodes are connected with electrodes of the piezoelectric actuators.

8. The method as defined in claim 1, wherein the second member has projecting parts and recess parts corresponding to a shape of the first member, and the method further comprises the steps of:
assembling the second member and a mold having projecting parts corresponding to the recess parts of the first member; and
then forming the first member by injecting material of the first member into spaces between the second member and the mold.

* * * * *